United States Patent
Segal

(10) Patent No.: US 11,405,587 B1
(45) Date of Patent: Aug. 2, 2022

(54) SYSTEM AND METHOD FOR INTERACTIVE VIDEO CONFERENCING

(71) Applicant: Touchcast LLC, New York, NY (US)

(72) Inventor: Edo Segal, Even Yehuda (IL)

(73) Assignee: TOUCHCAST LLC, New York, NY (US)

( * ) Notice: Subject to any disclaimer, the term of this patent is extended or adjusted under 35 U.S.C. 154(b) by 0 days.

(21) Appl. No.: 17/567,699

(22) Filed: Jan. 3, 2022

Related U.S. Application Data

(63) Continuation-in-part of application No. 17/165,674, filed on Feb. 2, 2021, and a continuation-in-part of
(Continued)

(51) Int. Cl.
*H04N 7/15* (2006.01)
*G06F 3/05* (2006.01)
(Continued)

(52) U.S. Cl.
CPC ............ *H04N 7/15* (2013.01); *G06F 3/0482* (2013.01); *G06F 3/0488* (2013.01); *G11B 27/031* (2013.01); *H04N 5/2222* (2013.01); *H04N 21/4223* (2013.01); *H04N 21/42203* (2013.01); *H04N 21/4316* (2013.01); *H04N 21/47* (2013.01); *H04N 21/4722* (2013.01); *H04N 21/4782* (2013.01); *H04N 21/4788* (2013.01); *H04N 21/6587* (2013.01); *G06F 3/04883* (2013.01); *G06F 3/167* (2013.01); *H04N 7/147* (2013.01); *H04N 21/478* (2013.01)

(58) Field of Classification Search
None
See application file for complete search history.

(56) References Cited

U.S. PATENT DOCUMENTS

| | | | |
|---|---|---|---|
| 6,020,931 | A | 2/2000 | Bilbrey et al. |
| 7,577,978 | B1 | 8/2009 | Wistendahl et al. |

(Continued)

FOREIGN PATENT DOCUMENTS

| | | |
|---|---|---|
| EP | 2262167 | 12/2010 |
| GB | 2502986 | 12/2013 |

(Continued)

*Primary Examiner* — Tapas Mazumder
(74) *Attorney, Agent, or Firm* — Leason Ellis LLP

(57) ABSTRACT

A system, method, and/or computer storage medium encoded with a computer program are disclosed for providing an interactive virtual event session for respective pluralities of devices substantially in real-time. A data communication session is provided, to which a plurality of computing devices operated by participants of an event session connect. Respective audio-video feeds including content captured by respective cameras and microphones configured with the plurality of computing devices are received. Moreover, at least some of the content in at least two of the respective audio-video feeds is adjusted, including by executing editing processes. Furthermore, a virtual setting for the event session is provided to each of the plurality of computing devices, and modified to include at least the adjusted content. Changing views of the adjusted content and the virtual setting is provided to each of the plurality of computing devices, using artificial intelligence.

18 Claims, 26 Drawing Sheets

Related U.S. Application Data application No. 17/001,047, filed on Aug. 24, 2020, and a continuation-in-part of application No. 16/820,573, filed on Mar. 16, 2020, said application No. 17/001,047 is a continuation of application No. 16/537,201, filed on Aug. 9, 2019, now Pat. No. 10,757,365, said application No. 17/165,674 is a continuation of application No. 16/508,058, filed on Jul. 10, 2019, now Pat. No. 10,911,716, said application No. 16/537,201 is a continuation-in-part of application No. 16/192,120, filed on Nov. 15, 2018, now Pat. No. 10,523,899, said application No. 16/508,058 is a continuation of application No. 16/134,638, filed on Sep. 18, 2018, now Pat. No. 10,356,363, said application No. 16/192,120 is a continuation-in-part of application No. 15/999,221, filed on Aug. 15, 2018, now abandoned, which is a continuation-in-part of application No. 16/002,668, filed on Jun. 7, 2018, now abandoned, and a continuation-in-part of application No. 16/002,701, filed on Jun. 7, 2018, now Pat. No. 10,531,044, which is a continuation of application No. 15/867,639, filed on Jan. 10, 2018, now Pat. No. 10,075,676, said application No. 16/134,638 is a continuation-in-part of application No. 15/683,403, filed on Aug. 22, 2017, now Pat. No. 10,033,967, which is a continuation of application No. 15/247,534, filed on Aug. 25, 2016, now Pat. No. 9,787,945, which is a continuation-in-part of application No. 14/833,984, filed on Aug. 24, 2015, now Pat. No. 9,661,256, which is a continuation-in-part of application No. 14/316,536, filed on Jun. 26, 2014, now Pat. No. 9,363,448.

(60) Provisional application No. 62/858,143, filed on Jun. 6, 2019, provisional application No. 62/833,396, filed on Apr. 12, 2019, provisional application No. 62/832,751, filed on Apr. 11, 2019, provisional application No. 62/819,501, filed on Mar. 15, 2019, provisional application No. 62/716,925, filed on Aug. 9, 2018, provisional application No. 62/565,094, filed on Sep. 28, 2017, provisional application No. 62/559,972, filed on Sep. 18, 2017, provisional application No. 62/545,994, filed on Aug. 15, 2017, provisional application No. 62/444,525, filed on Jan. 10, 2017, provisional application No. 62/329,081, filed on Apr. 28, 2016, provisional application No. 62/242,029, filed on Oct. 15, 2015, provisional application No. 62/209,727, filed on Aug. 25, 2015, provisional application No. 61/845,743, filed on Jul. 12, 2013, provisional application No. 61/839,757, filed on Jun. 26, 2013.

(51) Int. Cl.

| | |
|---|---|
| *G06F 3/0482* | (2013.01) |
| *H04N 21/6587* | (2011.01) |
| *H04N 21/4788* | (2011.01) |
| *H04N 21/4782* | (2011.01) |
| *H04N 21/4722* | (2011.01) |
| *H04N 21/431* | (2011.01) |
| *H04N 5/222* | (2006.01) |
| *G11B 27/031* | (2006.01) |
| *G06F 3/0488* | (2022.01) |
| *H04N 21/422* | (2011.01) |
| *H04N 21/4223* | (2011.01) |
| *H04N 21/47* | (2011.01) |
| *G06F 3/16* | (2006.01) |
| *G06F 3/04883* | (2022.01) |
| *H04N 7/14* | (2006.01) |
| *H04N 21/478* | (2011.01) |

(56) References Cited

U.S. PATENT DOCUMENTS

| | | | |
|---|---|---|---|
| 8,584,164 B2 | 11/2013 | Walter et al. | |
| 8,745,657 B2 | 6/2014 | Chalozin et al. | |
| 9,852,764 B2 | 12/2017 | Segal | |
| 2001/0006382 A1 | 7/2001 | Sevat | |
| 2002/0186233 A1 | 12/2002 | Holtz et al. | |
| 2004/0015398 A1 | 1/2004 | Hayward | |
| 2005/0137958 A1 | 6/2005 | Huber et al. | |
| 2005/0204438 A1 | 9/2005 | Wang | |
| 2006/0075668 A1 | 4/2006 | Sauer | |
| 2007/0089134 A1 | 4/2007 | Stearns | |
| 2007/0266322 A1 | 11/2007 | Tretter | |
| 2008/0033806 A1 | 2/2008 | Howe | |
| 2008/0068448 A1 | 3/2008 | Hansen | |
| 2008/0096175 A1 | 4/2008 | Du Toit et al. | |
| 2008/0109300 A1 | 5/2008 | Bason | |
| 2008/0120675 A1 | 5/2008 | Morad et al. | |
| 2008/0150913 A1 | 6/2008 | Bell et al. | |
| 2008/0218584 A1 | 9/2008 | Matsumoto et al. | |
| 2009/0066690 A1 | 3/2009 | Harrison | |
| 2009/0153804 A1 | 6/2009 | Giraldo et al. | |
| 2009/0237565 A1 | 9/2009 | Staker et al. | |
| 2010/0083191 A1 | 4/2010 | Marshall | |
| 2010/0111417 A1* | 5/2010 | Ward | G06T 7/579 |
| | | | 382/173 |
| 2010/0174783 A1 | 7/2010 | Zarom | |
| 2011/0161990 A1 | 6/2011 | Smith | |
| 2011/0249075 A1 | 10/2011 | Abuan et al. | |
| 2012/0158524 A1 | 6/2012 | Hintz | |
| 2012/0212571 A1 | 8/2012 | Wang et al. | |
| 2013/0031593 A1 | 1/2013 | Booth | |
| 2013/0073985 A1 | 3/2013 | Hamlin et al. | |
| 2013/0117129 A1 | 5/2013 | Brown et al. | |
| 2013/0155187 A1 | 6/2013 | Skyberg | |
| 2013/0173355 A1 | 7/2013 | Barcenas | |
| 2013/0212615 A1 | 8/2013 | Shultz | |
| 2014/0002581 A1 | 1/2014 | Bear et al. | |
| 2014/0012892 A1* | 1/2014 | Jaudon | H04L 67/38 |
| | | | 709/203 |
| 2014/0086557 A1 | 3/2014 | Yu et al. | |
| 2014/0132702 A1 | 5/2014 | Leibovich et al. | |
| 2014/0215542 A1 | 7/2014 | Terpe | |
| 2015/0043892 A1* | 2/2015 | Groman | H04N 21/2541 |
| | | | 386/278 |
| 2015/0121250 A1 | 4/2015 | Waxman et al. | |
| 2015/0149930 A1 | 5/2015 | Walkin et al. | |
| 2016/0098941 A1 | 4/2016 | Kerluke | |
| 2016/0300135 A1 | 10/2016 | Moudy et al. | |
| 2016/0300394 A1* | 10/2016 | Fischer | H04N 5/2723 |
| 2018/0150985 A1 | 5/2018 | McDonald | |

FOREIGN PATENT DOCUMENTS

| | | |
|---|---|---|
| WO | 2006021444 | 3/2006 |
| WO | 2010141939 | 12/2010 |
| WO | 2012139082 | 10/2012 |
| WO | 2013076478 | 5/2013 |
| WO | 2013167901 | 11/2013 |

* cited by examiner

SYSTEM AND METHOD FOR INTERACTIVE VIDEO CONFERENCING

CROSS-REFERENCE TO RELATED APPLICATIONS

This application is a continuation-in-part of U.S. patent application Ser. No. 17/165,674, filed Feb. 2, 2021, which is a continuation of U.S. patent application Ser. No. 16/508,058, filed Jul. 10, 2019, now U.S. Pat. No. 10,911,716, issued Feb. 2, 2021; further, U.S. patent application Ser. No. 16/508,058 is a continuation of U.S. patent application Ser. No. 16/134,638, filed Sep. 18, 2018, now U.S. Pat. No. 10,356,363, issued Jul. 16, 2019, which is based on and claims priority to U.S. Patent Application No. 62/559,972, filed Sep. 18, 2017 and U.S. Patent Application No. 62/565,094, filed Sep. 28, 2017; further, U.S. patent application Ser. No. 16/134,638, is a continuation-in-part of U.S. patent application Ser. No. 15/683,403, filed Aug. 22, 2017, now U.S. Pat. No. 10,033,967, issued Jul. 24, 2018, which is a continuation of U.S. patent application Ser. No. 15/247,534, filed Aug. 25, 2016, now U.S. Pat. No. 9,787,945, issued Oct. 10, 2017, which is based on and claims priority to U.S. Patent Application No. 62/209,727, filed Aug. 25, 2015, U.S. Patent Application No. 62/242,029, filed Oct. 15, 2015, and U.S. Patent Application No. 62/329,081, filed Apr. 28, 2016; still further, U.S. patent application Ser. No. 15/247,534 is a continuation-in-part of U.S. patent application Ser. No. 14/833,984, filed Aug. 24, 2015, now U.S. Pat. No. 9,661,256, issued May 23, 2017, which is a continuation-in-part of U.S. patent application Ser. No. 14/316,536, filed Jun. 26, 2014, now U.S. Pat. No. 9,363,448, issued Jun. 7, 2016, which claims priority to U.S. Patent Application No. 61/839,757, filed Jun. 26, 2013 and U.S. Patent Application No. 61/845,743, filed Jul. 12, 2013, the contents of all of which are incorporated by reference in their respective entireties, as if set forth expressly herein.

This application is also a continuation-in-part of U.S. patent application Ser. No. 17/001,047, filed Aug. 24, 2020, which is a continuation of U.S. patent application Ser. No. 16/537,201, filed Aug. 9, 2019, now U.S. Pat. No. 10,757,365, issued Aug. 25, 2020, which claims priority to U.S. Patent Application No. 62/716,925, filed on Aug. 9, 2018 and is a continuation-in-part of U.S. patent application Ser. No. 16/192,120, filed Nov. 15, 2018, now U.S. Pat. No. 10,523,899, issued on Dec. 31, 2019, which is a continuation-in-part of U.S. patent application Ser. No. 15/999,221, filed Aug. 15, 2018, which is based on and claims priority to U.S. Patent Application No. 62/545,994, filed Aug. 15, 2017; further, U.S. patent application Ser. No. 15/999,221 is a continuation-in-part of U.S. patent application Ser. No. 16/002,701, filed Jun. 7, 2018, now U.S. Pat. No. 10,531,044, issued on Jan. 7, 2020, which is a continuation of U.S. patent application Ser. No. 15/867,639, filed Jan. 10, 2018, now U.S. Pat. No. 10,075,676, issued on Sep. 11, 2018, which claims priority to U.S. Patent Application No. 62/444,525, filed Jan. 10, 2017, U.S. Patent Application No. 62/545,994, filed Aug. 15, 2017, and U.S. Patent Application No. 62/565,094, filed Sep. 28, 2017; further, U.S. patent application Ser. No. 15/999,221 is a continuation-in-part of U.S. patent application Ser. No. 16/002,668, filed Jun. 7, 2018, the contents of all of which are incorporated by reference in their respective entireties, as if set forth herein.

Moreover, this application is a continuation-in-part of U.S. patent application Ser. No. 16/820,573, filed Mar. 16, 2020, which is claims priority to U.S. Patent Application Ser. No. 62/819,501, filed Mar. 15, 2019, U.S. Patent Application No. 62/832,751, filed Apr. 11, 2019, U.S. Patent Application No. 62/833,396, filed Apr. 12, 2019, and U.S. Patent Application No. 62/858,143, filed Jun. 6, 2019, all of which are incorporated by reference in their respective entireties, as if expressly set forth herein.

FIELD

The present disclosure relates, generally, to content presentation and, more particularly, to a system and method for providing and interacting with content via interactive communication sessions.

BACKGROUND

Interactive and supplemental content that has been made available to viewers has been done through a decoupled, separate communication channel. For instance, a producer can provide a separate communication channel with data, a video stream, or both at a URL associated with the broadcast. For example, a television station can have on-air programming and also provide supplemental content available through a website. Apart from sponsoring both sources of information, these communication channels are generally decoupled from one another. In other words, the broadcaster has only an indirect relationship to the viewer with regard to any supplemental content.

One of the biggest missed opportunities of the entire category of smart TV connected devices is the absence of easy to deploy video conferencing. As millions of consumers place these devices in their living rooms the core use case of facilitating communications via the large screen TV is missing.

It is with respect to these and other considerations that the disclosure made herein is presented.

BRIEF SUMMARY

In one or more implementations of the present disclosure, a system, method, and/or computer storage medium encoded with a computer program are disclosed for providing an interactive virtual event session for respective pluralities of devices substantially in real-time. A data communication session is provided, to which a plurality of computing devices operated by participants of an event session connect. Respective audio-video feeds including content captured by respective cameras and microphones configured with the plurality of computing devices are received, from the plurality of computing devices via the data communication session. Moreover, at least some of the content in at least two of the respective audio-video feeds is adjusted, including by executing editing processes. Furthermore, a virtual setting for the event session is provided to each of the plurality of computing devices, and modified to include at least the adjusted content. Changing views of the adjusted content and the virtual setting is provided to each of the plurality of computing devices, using artificial intelligence.

In one or more implementations of the present disclosure, at least one virtual display screen in the virtual setting is provided by the at least one computing device, and at least some of the adjusted content is included in the at least one virtual display screen.

In one or more implementations of the present disclosure, at least some of the content is adjusted using artificial intelligence, by the at least one computing device, to identify background elements. Further, artificial intelligence is used by the at least one computing device to remove the identified background elements and to isolate at least one subject.

In one or more implementations of the present disclosure, the at least one computing device positions the isolated at least one subject in the virtual setting.

In one or more implementations of the present disclosure, adjusting at least some of the content comprises the at least one computing device using artificial intelligence to identify background elements to remove the identified background elements and to isolate at least one subject. Further, the isolated at least one subject is positioned in the virtual setting by the at least one computing device, and at least one virtual display screen is provided in the virtual setting. The isolated at least one subject is displayed in the at least one virtual display screen.

In one or more implementations of the present disclosure, the at least one computing device provides the respective audio-video feeds to a 3-D graphics engine.

Other features and advantages of the present invention will become apparent from the following description of the invention that refers to the accompanying drawings.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION

Figure 1:
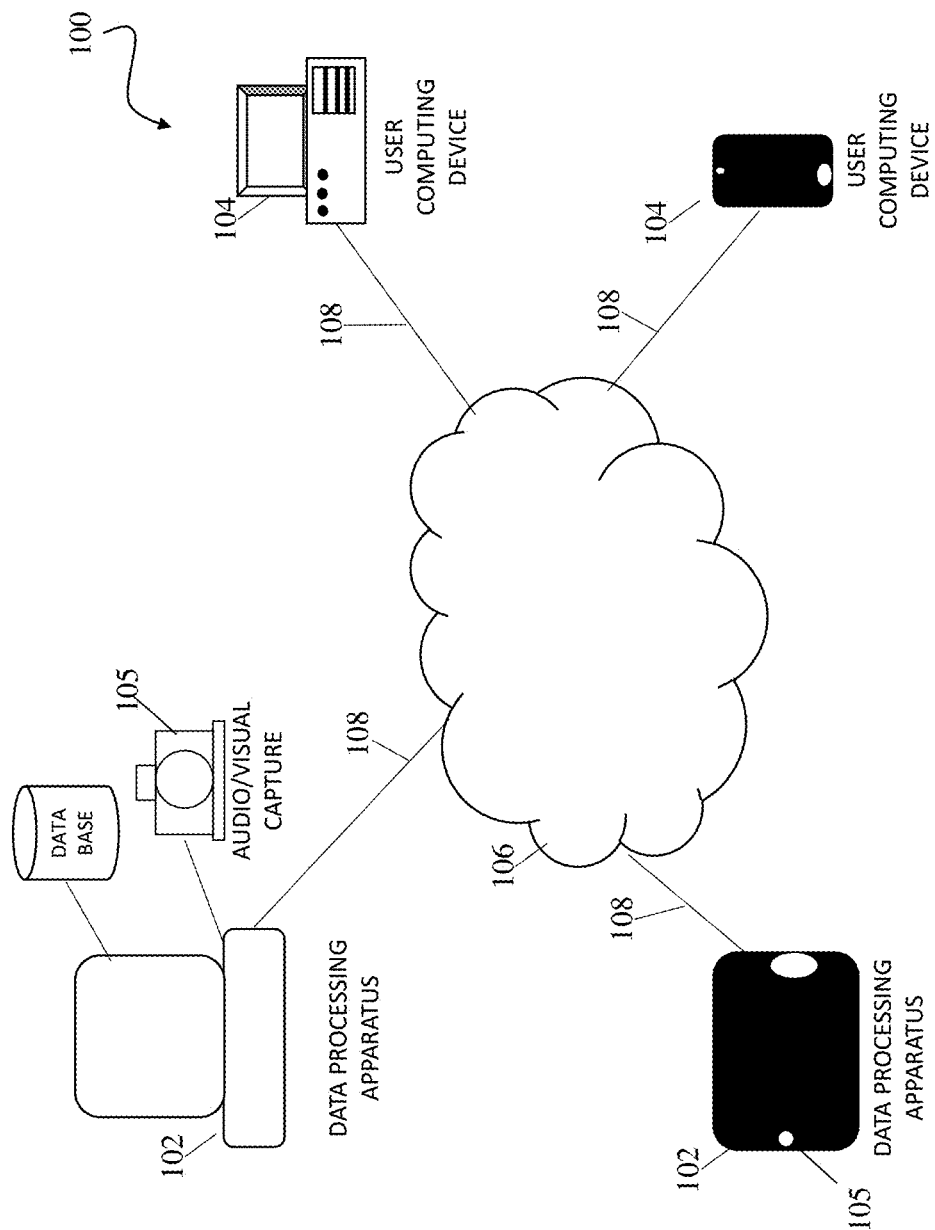
FIG. 1 is a diagram illustrating an example hardware arrangement that operates for providing the systems and methods disclosed herein.

By way of overview and introduction, the present disclosure provides systems and methods for facilitating, managing, and providing on-line events and meetings. The present disclosure provides systems and methods for creation of content, live video event manages content and information to be provided during online events and meetings, as well as for generating and managing archives thereof. The present disclosure provides a set of tools for creating a virtual environment that includes a mixed-reality world of virtual sets and live video streams that enables users to attend large scale events and stay engaged in virtual conferences that can last days or longer.

More particularly, the present disclosure provides virtual events as structured, organized gatherings that take place entirely via a digital platform, as opposed to or in addition to taking place in-person. The virtual events provided in accordance with the present disclosure can range in size, and may be small online meetings or virtual conferences with thousands of attendees worldwide. Further, virtual events provided in accordance with the present disclosure can vary in format. For example, virtual events can be single webinars with one presenter or can be multi-day virtual conventions with numerous tracks and concurrent virtual speakers.

In one or more implementations, virtual attendees join a virtual event within a digital platform. They can do this from their own individual physical locations using some form of video conferencing software. Virtual events typically occur in real-time, and have the option of being recorded. This allows them to be accessible to attendees for extended periods of time after the initial broadcast.

In one or more implementations, speakers at on-line conferences and events appear transported into virtual sets, such as a stage within an auditorium or theater, thereby providing an immersive user experience for attendees. The tools of the present disclosure provide an intersection of mixed reality (e.g., reality, virtual reality, and/or augmented reality) and artificial intelligence, thereby creating an illusion of a large-scale production to which users connect remotely, such as from their respective home offices. Participants of a virtual, on-line conference experience speakers in attractive, virtual spaces that look and feel real.

The present disclosure includes production tools for creating and utilizing events of comprised of mixed reality venues, including by processing live video feed received from one or more sources to provide a multi-media experience that appears as a multi-camera production, regardless of where the host or attendees are located. Information associated with on-line events including, for example, content provided during an event, information associated with presenters, information associated with speakers, and information associated with attendees, and technology respectively used thereby, can be received via one or more user interfaces, data import operations or other suitable technology. Further, users can configure options associated with the present disclosure to manage information associated with event schedules (at least partially referred to herein, generally, as "tracks"), agendas, and various kinds of event settings. Moreover, interpersonal communications can be managed, such as by providing registrants with access of to interface in chat rooms or to communicate in various ways during a respective session, and/or over the course of a multiple-day event.

Events that are provided in connection with the present disclosure can occur over a short period, such as minutes or over hours, or can occur over a longer period, such as over the course of days or weeks. Events can include various forms of interaction live video content and prerecorded content presented in an unlimited number of virtual spaces and locations, such as theaters, museums, malls, classrooms, lecture halls, outdoor parks and nature preserves, homes, or virtually any other suitable location.

In addition, discussions that take place during events, including presentations, talks, meetings, chats, or other interactivity, can be transcribed automatically into electronic text. In one or more implementations, systems and methods disclosed herein are implemented as a function of one or more artificial intelligent agents. The agents provided with the present disclosure can be configured to interface with a plurality of computer-based (e.g., software) agents that operate in disparate computing environments. Such interaction enhances meeting sessions, and representations of meetings can be enhanced as a function of content that is retrieved from a multitude of sources and provided via one or more of the agents. For example, the content can be retrieved in response to request(s) from a user or can be retrieved independently and proactively, such as via real-time analysis of user discussions and other activity that is "observed" during the meeting.

Thus, in one or more implementations, a packaged multimedia file, such as interactive video shown and described herein, is processed using voice recognition, optical character recognition or other processing occurs, including substantially in real-time, to generate analytics for additional functionality. Analytics associated with user activity can be provided, such as relating to where, when, and how users interact with content and each other.

In accordance with the teachings herein, implementations of the present disclosure provide a simple to use, informing and entertaining communications experience that incorporates content from a plurality of computing devices, e.g., smartphones, tablets, laptops and desktops, and enables live sharing in a real-time and conferencing capability therefor. In one or more implementations, one or more televisions can be used for respective audio/visual display devices, and can provide feed from cameras and/or microphones configured with various local and/or remotely located computing devices that are communicating over data-communication networks such as the Internet. A television can be implemented in the present disclosure in various ways, such as via an Internet media extender provided by APPLE TV, ROKU, AMAZON FIRE TV or GOOGLE CHROMECAST. As used herein, an Internet media extender refers, generally, to a category of devices that provide for content to be streamed to a television, surround sound devices, and the like. Unlike functionality provided by known Internet media extenders, however, the present disclosure facilitates integrating audio/video input capabilities of computing devices (e.g., microphones, cameras and software that drive and enhance audio/visual captures) into video-conferencing capabilities. The present disclosure facilitates one or more of: one-to-one (1:1) video conferencing; group video conferencing; sharing and/or viewing of content provided on a plurality of computing devices, and interactive computing activities.

The present disclosure improves live and online meetings, including by determining whether scheduled attendees are present and accounted for, and whether attendees are complying with a predetermined agenda during a meeting. Moreover, action items that are discussed during the meeting can be collected as a function of one or agent-based operations, and the action items can be assigned to one or more of the attendees, for example, during the meeting or shortly thereafter.

The present disclosure can also be configured with technology to provide post-meeting summaries to attendees and other individuals as a function of recorded meeting discussions and/or analyzed content discussed during a meeting. The summaries can be configured in various ways, including in "smart" notes that include interactivity. In one or more implementations, the smart notes are configured as interactive video, such as shown and described in U.S. patent application Ser. No. 15/247,534, entitled SYSTEM AND METHOD FOR INTERACTIVE VIDEO CONFERENCING and filed Aug. 25, 2016, and U.S. patent application Ser. No. 14/316,536, entitled SYSTEM AND METHOD FOR PROVIDING AND INTERACTING WITH COORDINATED PRESENTATIONS and filed Jun. 26, 2014, which are incorporated by reference herein.

Post-meeting summaries that are generated in accordance with the present disclosure can be particularly useful to allow attendees to participate during meetings without being distracted by a need to take detailed written notes. Additionally, due to the retrievable and interactive nature of meeting summaries generated in accordance with the present disclosure, attendees can be provided with a valuable resource that enables improved participation in subsequent meetings. For example, prior to the start of a meeting or during a meeting, summaries of previous meetings can be generated, compiled and/or provided as a function of the present disclosure, and can be provided to participants, such as on-demand or substantially automatically.

Referring to FIG. 1 a diagram is provided of an example hardware arrangement that operates for providing the systems and methods disclosed herein, and designated generally as system 100. System 100 can include one or more data processing apparatuses 102 that are at least communicatively coupled to one or more user computing devices 104 across communication network 106. Data processing apparatuses 102 and user computing devices 104 can include, for example, mobile computing devices such as tablet computing devices, smartphones, personal digital assistants or the like, as well as laptop computers and/or desktop computers. Further, one computing device may be configured as a data processing apparatus 102 and a user computing device 104, depending upon operations be executed at a particular time. In addition, an audio/visual capture device 105 is depicted in FIG. 1, which can be configured with one or more cameras (e.g., front-facing and rear-facing cameras), a microphone, a microprocessor, and a communications module(s) and that is coupled to data processing apparatus 102. The audio/visual capture device 105 can be configured to interface with one or more data processing apparatuses 102 for producing high-quality audio/video content.

With continued reference to FIG. 1, data processing apparatus 102 can be configured to access one or more databases for the present disclosure, including image files, video content, documents, audio/video recordings, metadata and other information. In addition, data processing apparatus 102 can be configured to access Internet websites and other online content. It is contemplated that data processing apparatus 102 can access any required databases via communication network 106 or any other communication network to which data processing apparatus 102 has access. Data processing apparatus 102 can communicate with devices including those that comprise databases, using any known communication method, including Ethernet, direct serial, parallel, universal serial bus ("USB") interface, and/or via a local or wide area network.

User computing devices 104 communicate with data processing apparatuses 102 using data connections 108, which are respectively coupled to communication network 106. Communication network 106 can be any communication network, but is typically the Internet or some other global computer network. Data connections 108 can be any known arrangement for accessing communication network 106, such as the public internet, private Internet (e.g., VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, software applications, or other software and/or hardware tools, to provide received data on audio/visual devices incorporated therewith. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and data processing apparatuses 102. In one or more implementations, the present disclosure provides improved processing techniques to prevent packet loss, to improve handling interruptions in communications, and other issues associated with wireless technology.

According to an embodiment of the present disclosure, user computing device 104 provides user access to data processing apparatus 102 for the purpose of receiving and providing information. Examples and description of specific functionality provided by system 100, and in particular data processing apparatuses 102, is described in detail below.

System 100 preferably includes software that provides functionality described in greater detail herein, and preferably resides on one or more data processing apparatuses 102 and/or user computing devices 104. One of the functions performed by data processing apparatus 102 is that of operating as a web server and/or a web site host. Data processing apparatuses 102 typically communicate with communication network 106 across a permanent i.e., unswitched data connection 108. Permanent connectivity ensures that access to data processing apparatuses 102 is always available.

Figure 2:
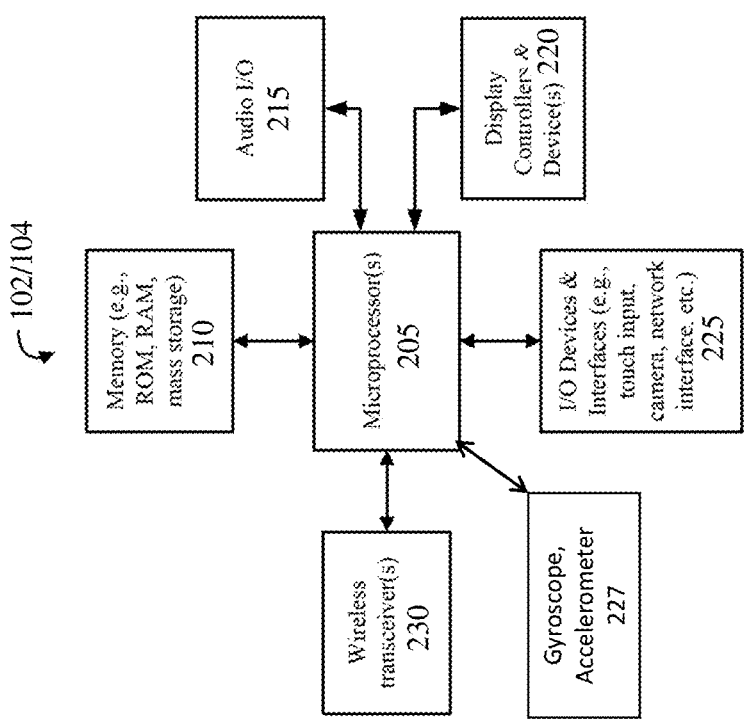
FIG. 2 is a block diagram that illustrates functional elements of a computing device, in accordance with an implementation of the present disclosure.

FIG. 2 illustrates, in block diagram form, an exemplary data processing apparatus 102 and/or user computing device 104 that can provide functionality in accordance with interactive conferencing, as described herein. Although not expressly indicated, one or more features shown and described with reference to FIG. 2 can be included with or in the audio/visual capture device 105, as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random-Access Memory ("RAM"), Read Only Memory ("ROM"), Flash, Phase Change Memory ("PCM"), or other type of memory.

The data processing apparatus 102 and/or user computing device 104 also includes an audio input/output subsystem 215 which may include a microphone and/or a speaker for, for example, playing back music, providing telephone or voice/video chat functionality through the speaker and microphone, etc.

A display controller and display device 220 provides a visual user interface for the user; this user interface may include a graphical user interface which, for example, is similar to that shown on a Macintosh computer when running Mac OS operating system software or an iPad, iPhone, or similar device when running mobile computing device operating system software.

The data processing apparatus 102 and/or user computing device 104 also includes one or more wireless transceivers 230, such as an IEEE 802.11 transceiver, an infrared transceiver, a Bluetooth transceiver, a wireless cellular telephony transceiver (e.g., 1G, 2G, 3G, 4G, 5G), or another wireless protocol to connect the data processing system 100 with another device, external component, or a network. In addition, Gyroscope/Accelerometer 235 can be provided.

It will be appreciated that one or more buses, may be used to interconnect the various modules in the block diagram shown in FIG. 2.

The data processing apparatus 102 and/or user computing device 104 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing apparatus 102 and/or user computing device 104 may be a network computer or an embedded processing apparatus within another device or consumer electronic product.

The data processing apparatus 102 and/or user computing device 104 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 102 and/or user computing device 104. The I/O devices and interfaces 225 may include a connector for a dock or a connector for a USB interface, FireWire, etc. to connect the system 100 with another device, external component, or a network.

Moreover, the I/O devices and interfaces can include gyroscope and/or accelerometer 227, which can be configured to detect 3-axis angular acceleration around the X, Y and Z axes, enabling precise calculation, for example, of yaw, pitch, and roll. The gyroscope and/or accelerometer 227 can be configured as a sensor that detects acceleration, shake, vibration shock, or fall of a device 102/104, for example, by detecting linear acceleration along one of three axes (X, Y and Z). The gyroscope can work in conjunction with the accelerometer, to provide detailed and precise information about the device's axial movement in space. More particularly, the 3 axes of the gyroscope combined with the 3 axes of the accelerometer enable the device to recognize approximately how far, fast, and in which direction it has moved to generate telemetry information associated therewith, and that is processed to generate coordinated presentations, such as shown and described herein.

It will be appreciated that additional components, not shown, may also be part of the data processing apparatus 102 and/or user computing device 104, and, in certain embodiments, fewer components than that shown in FIG. 2 may also be used in data processing apparatus 102 and/or user computing device 104. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 210 or other machine-readable storage medium. The software may further be transmitted or received over a network (not shown) via a network interface device 225. In various embodiments, hardwired circuitry may be used in combination with the software instructions to implement the present embodiments. Thus, the techniques are not limited to any specific combination of hardware circuitry and software, or to any particular source for the instructions executed by the data processing apparatus 102 and/or user computing device 104.

In one or more implementations, the present disclosure provides improved processing techniques to prevent packet loss, to improve handling interruptions in communications, to reduce or eliminate latency and other issues associated with wireless technology. For example, in one or more implementations Real Time Streaming Protocol (RTSP) can be implemented, for example, for sharing output associated with a camera, microphone and/or other output devices configured with a computing device. RTSP is an effective (though not necessary in all implementations) network control protocol for entertainment and communications systems, including in connection with streaming output. RTSP is used in the present disclosure, at least in part, for establishing and controlling media sessions between various end points, including user computing devise 104, Internet media extender 110 and data processing apparatus 102.

In addition to RTSP, one or more implementations of the present disclosure can be configured to use Web Real-Time Communication ("WebRTC") to support browser-to-browser applications, including in connection with voice, video chat, and peer-to-peer ("P2P") file sharing. Thus, the present disclosure avoids a need for either internal or external plugins to connect endpoints, including for voice/video or other communication sharing. In one or more implementations, the present disclosure implements WebRTC for applications and/or Internet web sites to capture and/or stream audio and/or video media, as well as to exchange data between browsers without requiring an intermediary. The set of standards that comprises WebRTC makes it possible to share data and perform teleconferencing peer-to-peer, without requiring that the user install plug-ins or any other third-party software. WebRTC includes several interrelated APIs and protocols which work together.

In one or more implementations, at least one of the Internet media extender components 110 includes APPLE TV. After an Internet media extender 110 is installed (e.g., connected to a television set and connected to a Wi-Fi, Ethernet or other local area network), a software application is installed on the Internet media extender 110, as well as at least one mobile computing device 104. For example, a user downloads and installs an app to an Internet media extender 110 ("TV APP") and also installs an app to a user computing device 104 ("MOBILE APP"). Once installed, and the first time the TV APP is executed, the user is prompted to launch the MOBILE APP. Thereafter, the mobile computing device 104 (e.g., an iPhone) is automatically detected by the TV APP. During subsequent uses, video content that is provided as a function audio/video output from the computing device (e.g., iPhone) is provided instantly on the television that is connected to the Internet media extender 110. In operation, audio/video feed from the iPhone is provided on big screen. The TV APP and the MOBILE APP may be configured as a single application (e.g., distributed as a single application), or may be provided as separate applications.

In one or more implementations, each of a plurality of participants operating, for example, user computing device 104 participate in an interactive video conference at least in part by establishing a data/communication session with the data processing apparatus 102. A form of a star topology is established, in which data processing apparatus 102 is communicatively connected to each of a plurality of respective user computing devices 104 and respectfully receives audio/video feed from each device, such as provided as a function of input from a respective camera and/or microphone.

Thus, in one or more implementations, the present disclosure can implement a star topology in which a central node (e.g., a data processing apparatus 102) receives low resolution of video content from each of a plurality of computing devices (e.g., client devices 104). The central node can be configured by executing program instructions to compose a single video comprising all of the video received from the various devices. The single video can be provided substantially in real-time as one high-definition ("HD") video. The central node can send the HD video to all of the computing devices operated by the various users, as well as to the device operated by the "presenter."

Continuing with the respective one or more implementations described above, each of the respective individual feeds from the respective devices is received by the data processing apparatus 102 and the video feeds (including, for example, images) are composed into a single video stream. The video stream can be configured as a high-definition stream (e.g., 1280×720 or higher resolution), and output to each of at least some of the respective user computing devices 104.

Figure 3:
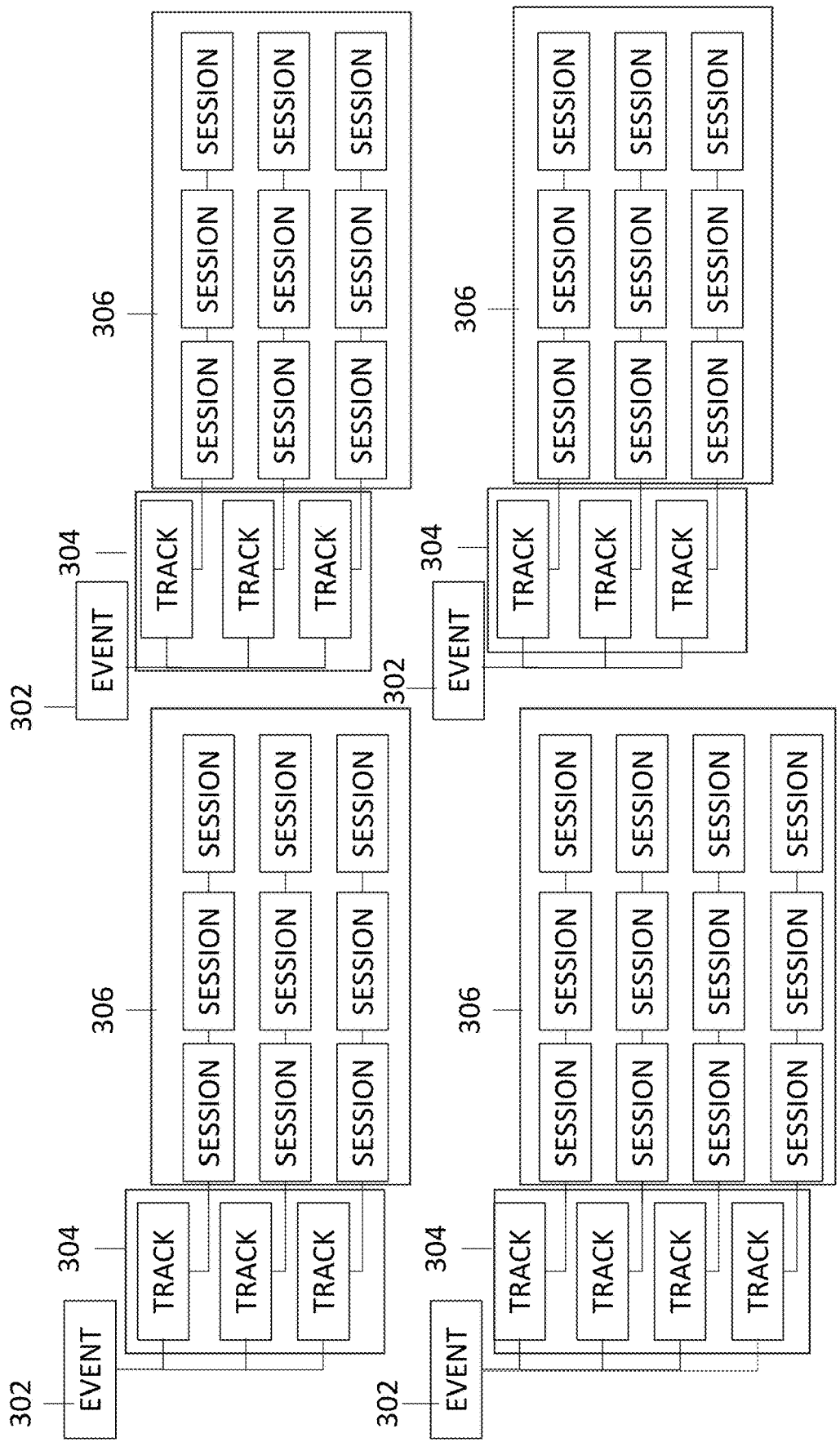
FIG. 3 is a block diagram illustrating an example event schedule that includes multiple dates, tracks, and sessions.

FIG. 3 is a block diagram illustrating an example event schedule that includes multiple events 302, tracks 304, and sessions 306. For each respective date, a plurality of tracks is provided representing options for participants, e.g., registrants, to select which correspond with respective sessions. Features and descriptions associated with events 302, tracks 304, and sessions 306 are provided herein.

Figure 4:
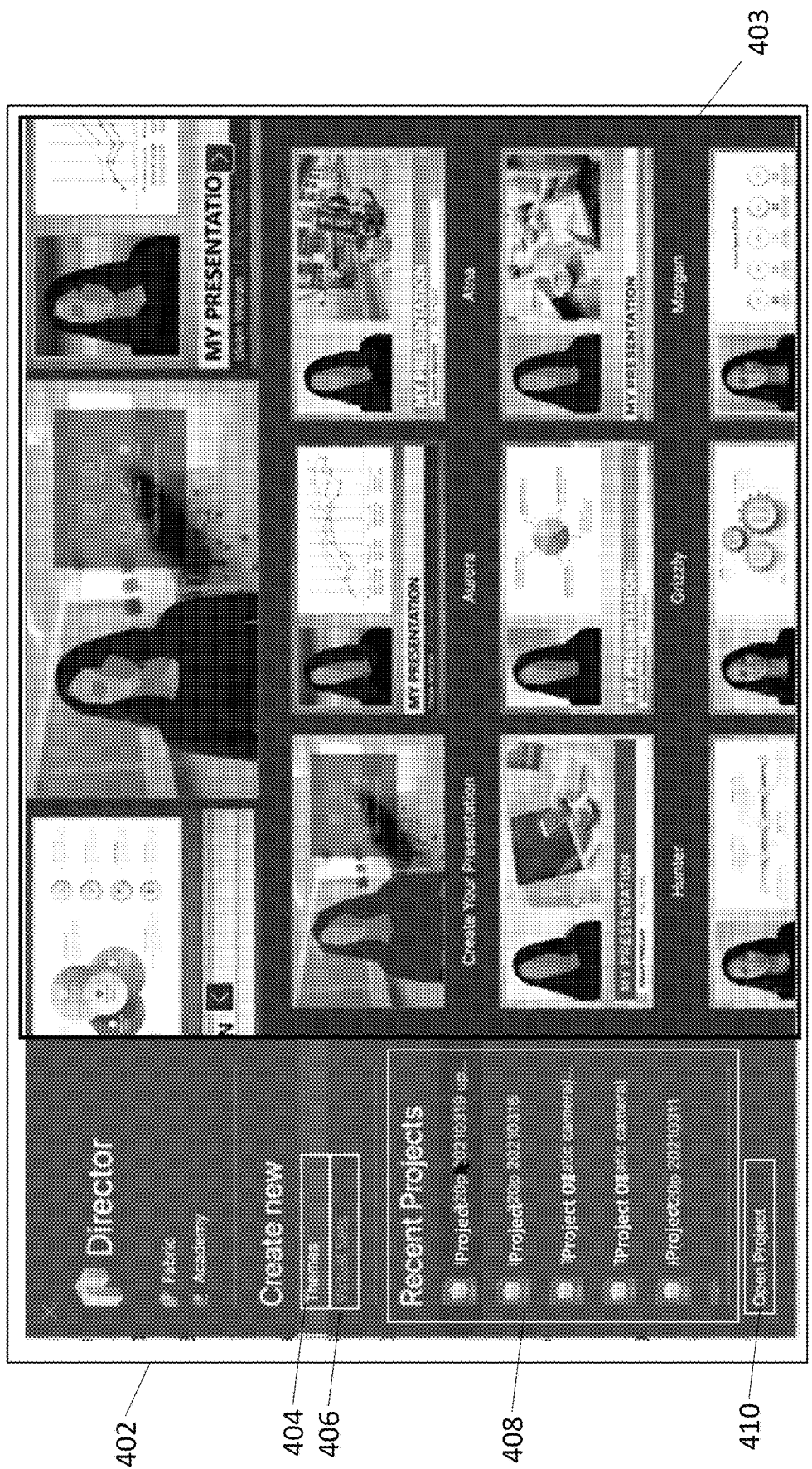
FIG. 4 is an example data entry display screen for creating, modifying and/or removing projects, in accordance with an implementation of the present disclosure.

FIG. 4 is an example data entry display screen for creating, modifying and/or removing projects, which can be used to provide content in customized ways for participants of respective sessions 306. In the example shown in FIG. 4, projects section 402 presents options for generating new themes 404, generating new virtual sets 406, selecting a recently used project 408, and accessing an existing project 410 that may not have been recently created or accessed. In the example shown in FIG. 4 option 404 has been selected and a number of selectable project themes 403 are displayed, which are usable as a basis for generating a new project. Each theme is provided with a respective named style (e.g., "Aurora," "Atna," "Hunter," "Grizzly," or the like). Each respective theme provides for developing a custom presentation for a presenter, and can include corresponding materials, such as charts, images, audio-video content, or virtually any other suitable image, video, or multimedia the user(s) want to present in a respective session 306. Once a project is created, the project can be saved to one or more computing devices, for example, to data processing apparatus 102, for inclusion in one or more events 302, tracks 304, and/or sessions 306.

For example, a session 306 for a respective track 304 can be produced before an event 302 airs, using content previously received and processed into MP4 or other video file type. The respective project saved as an MP4 file can be, thereafter, streamed. Moreover, as shown and described herein, instructions can be processed by one or more processors, e.g., provided with user computing device 104, to cause real-time video feeds to be combined with an MP4 file. Moreover, while received video feeds and MP4 files may be two-dimensional ("2-D") the files can be presented to appear three-dimensional ("3-D"), including by altering skew or perspective, by distorting, warping, or via other transformation process, such as to fit the angle of one or more screens that are provided in a virtual auditorium or other venue.

In accordance with the present disclosure, streaming audio-video input is received from a plurality of users, including presenters and participants. Once received, the live stream of the input can be captured and processed, for example, for presentation in photorealistic virtual settings. As described herein, the term photorealistic environment refers a virtual setting that appears real as if capable of being photographed with a camera.

The present disclosure supports processing of a plurality of audio-video feeds from computing devices connected in an interactive data-communication session (e.g., a video conference session) can be presented individually or simultaneously, and in any combination. In one or more implementations of the present disclosure, a plurality of templates can be defined and selected for presentation of respective audio-video feeds received from computing devices during an interactive data-communication session. The templates can include placeholders for providing one or more respective audio-video feeds as well as for content, such as image(s), video, presentations (including slides), internet web sites, or virtually any other content. Furthermore, as shown and described herein, additional functionality can be provided, such as to provide changing backgrounds, audio effects, and visual effects to alter one or more audio-video feeds substantially in real time, such as during a session 306.

Figure 5A:
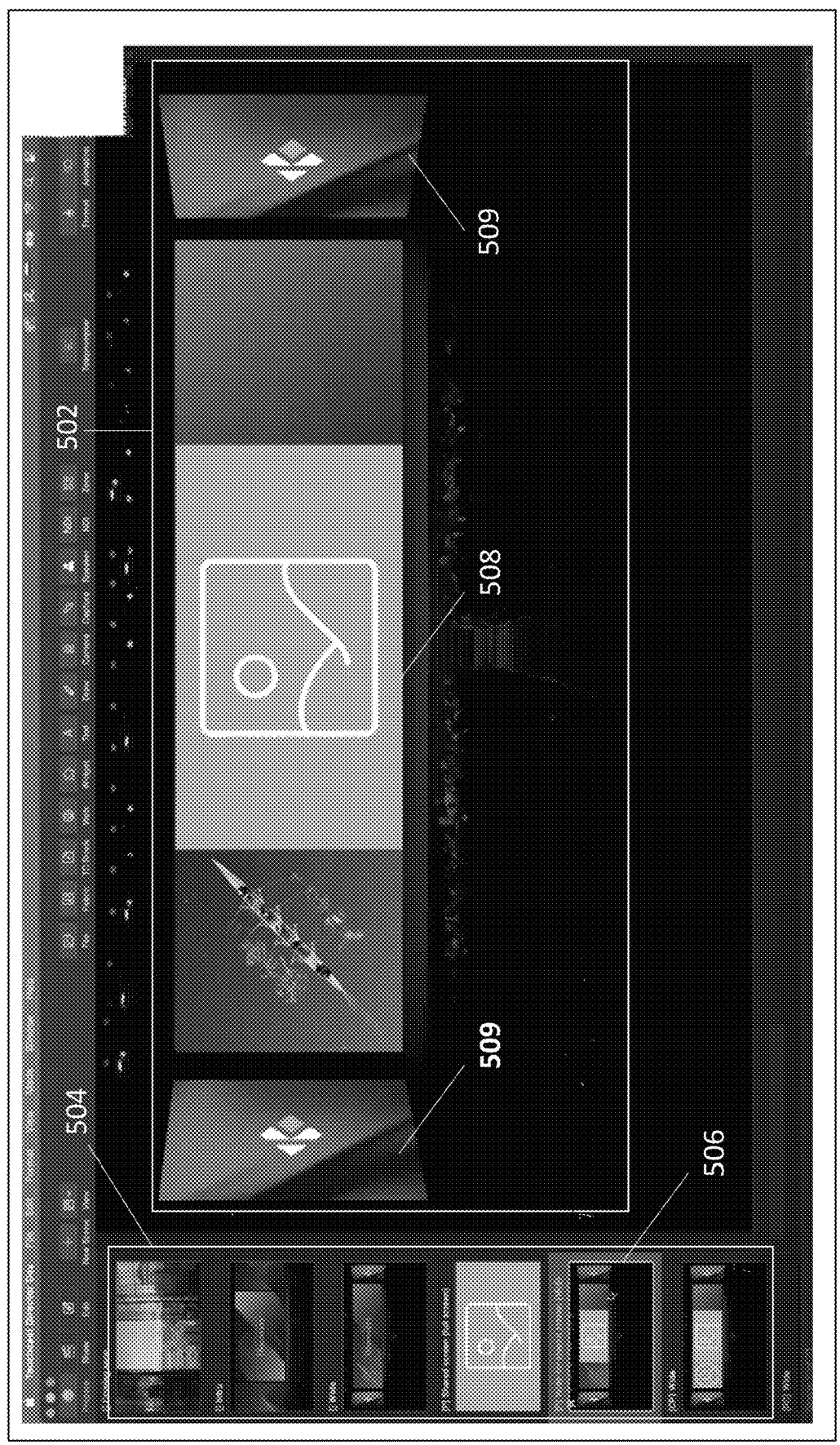
FIGS. 5A-5C illustrate example screen displays that are provided, in connection with an example implementation of the present disclosure, in connection with an example implementation of the present disclosure.
Figure 5B:
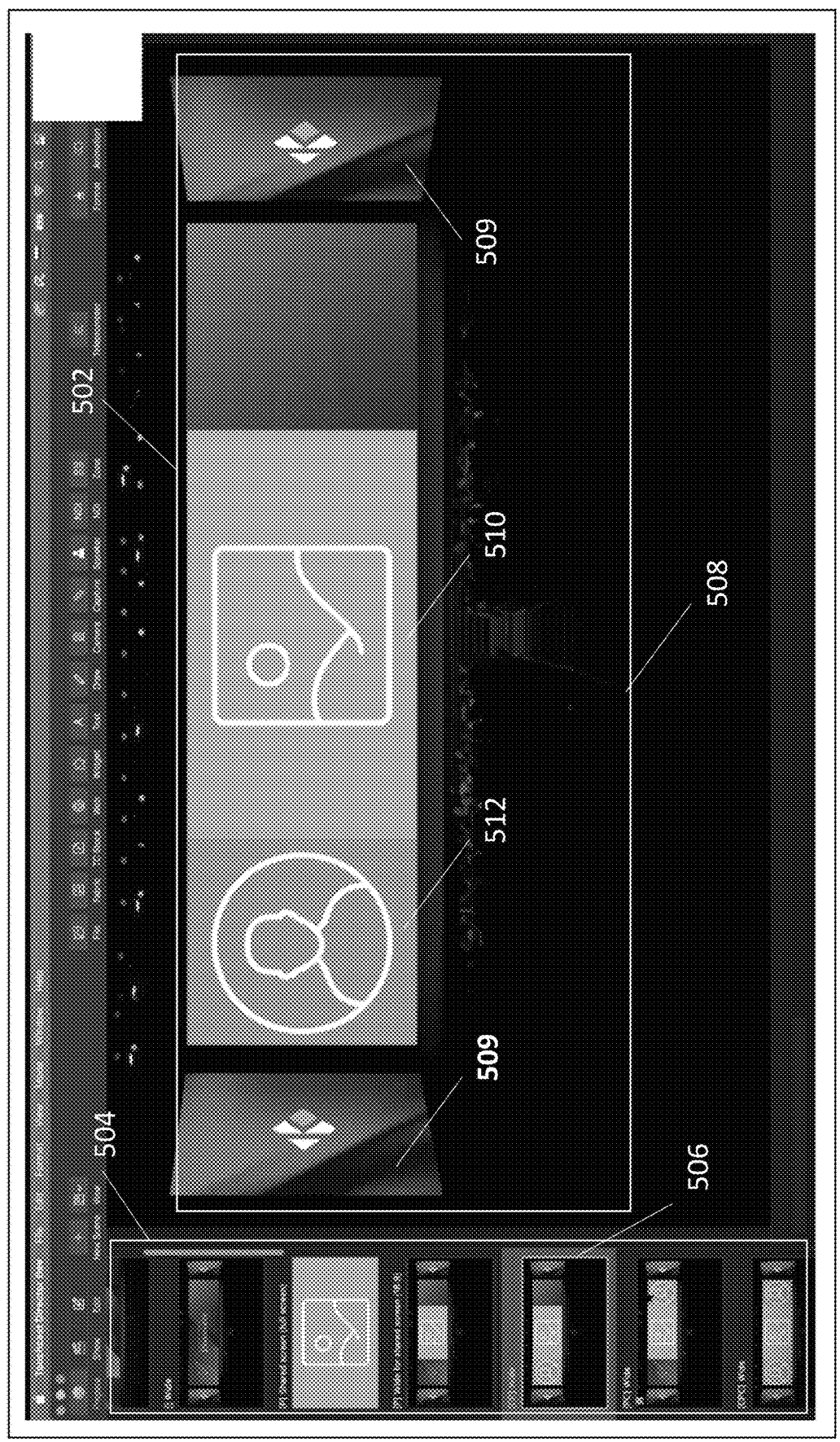
Figure 5C:
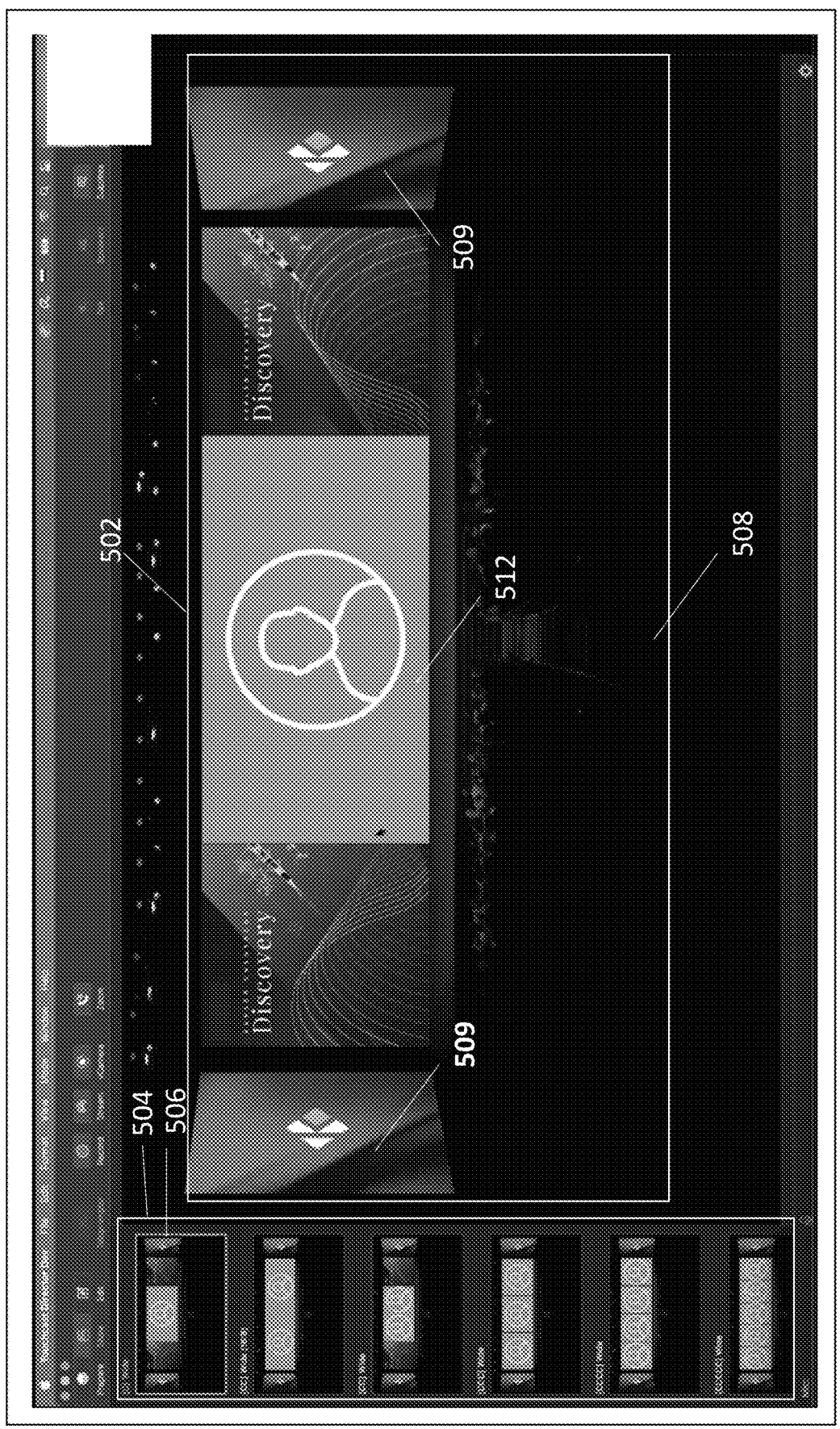

FIGS. 5A-5C illustrate example screen displays that are provided in connection with an example implementation of the present disclosure. In the example shown in FIGS. 5A-5C, preview display section 502 which, in one or more implementations, represents the output displayed to each of a plurality of participants in an event session 306. For example, preview display section 502 illustrates a virtual auditorium and is displayed to participants who are virtually present in the audience. Also, as shown in the example screen displays in FIGS. 5A-5C, template options section 504 is provided, which includes a plurality of display templates that can be selected for presenting during an event session 306. For example, the respective templates in section 504 allow for presenting a single audio-video feed received during a data-communication session, or multiple audio-video feed. Selected template 506 within options section 504 is highlighted, which indicates that the respective template that is active and displayed within section 502.

In the example displays shown in FIG. 5A, the selected template 506 within options section 504 includes a placeholder 510 for a presenter's computing device display screen to be shared and featured in the display region, including as set forth in preview section 502. During an active session 306, the presenter's display screen will be shared in the region 508. In the example shown in FIG. 5A, the selected template 506 within options section 504 is formatted in a wide format and includes additional imagery adjacent to the shared display screen within region 508.

An alternative example display shown in FIG. 5B that includes a selected template 506 within options section 504 having a placeholder 510 in display region 508 for the participant's shared display screen, as well as a placeholder 512 for presenting the audio-video feed received from a participant during a data-communication session. FIG. 5C illustrates another alternative display that includes a selected template 506 within options section 504 having the placeholder 512 for presenting the audio-video feed received from the participant during the data-communications session. Various other templates are supported in option section 504, including those shown and described in greater detail below.

As noted herein, the present disclosure presents photorealistic virtual events that provide significant improvements in interactive audio-visual technology and aesthetics. For example, as shown in the example virtual auditorium environment in FIGS. 5A-5C, some virtual display screens 509 appear placed at an angle, for example, for improved viewing by audience members seated in particular areas of the auditorium. One or more instructions can be executed by a processor to transform received audio-video feed, such as skewing the perspective of the display, to improve realism for participants who are virtually present. As used herein, the term audio-video feed refers, generally, to content received during a data-communication session, including audio content, video content, single image content, or any combination thereof.

Figure 6:
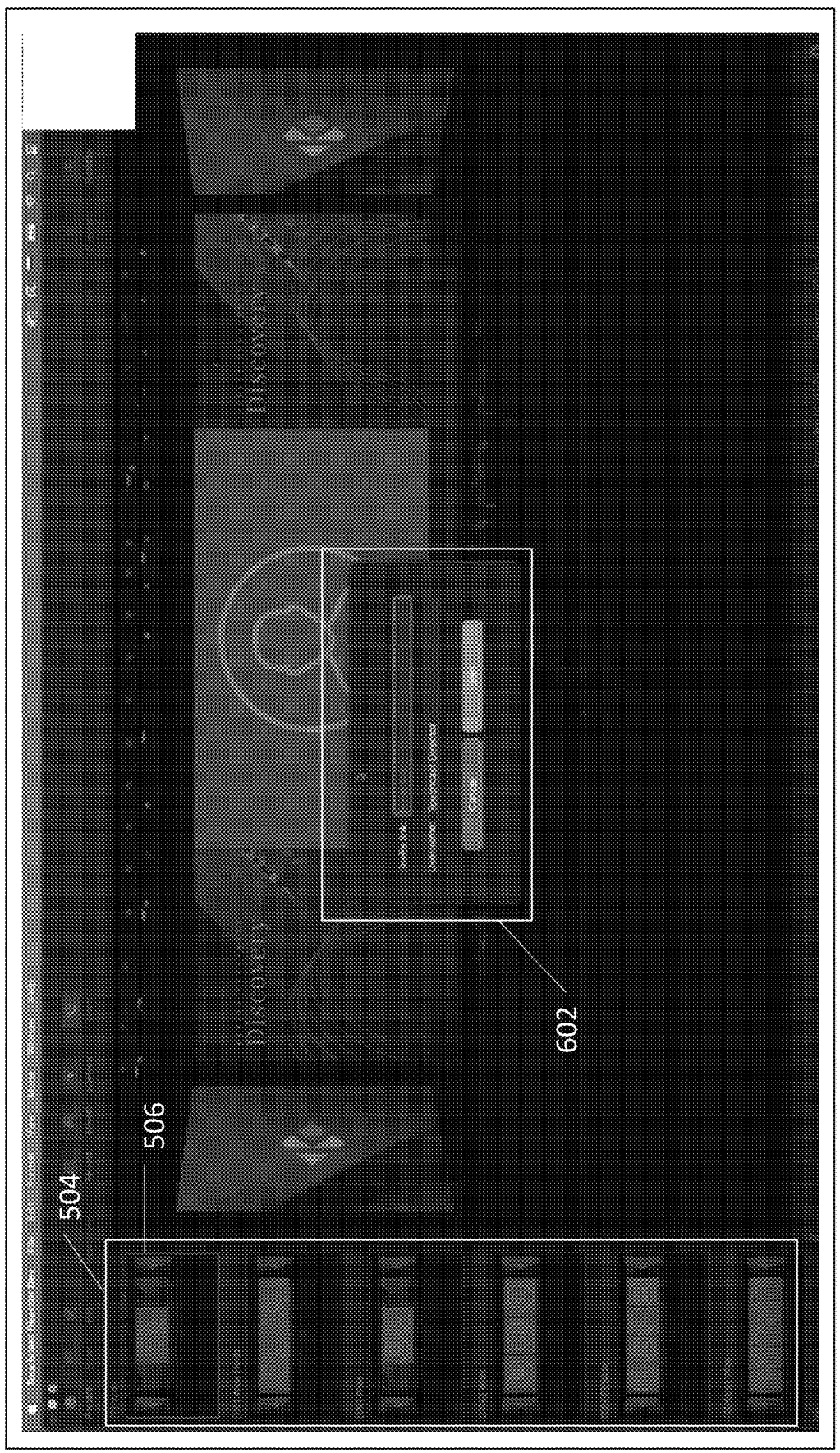
FIG. 6 illustrates an example dialogue box that includes options for a user to connect to an interactive data-communication session as a presenter, in connection with an example implementation of the present disclosure.

Once a template 506 has been selected (referred to herein, generally, as a "selected template") within options section 504, one or more respective audio-video feeds can be provided within the respective placeholder(s) (e.g., placeholder 512). For example, a hyperlink can be transmitted to one or more presenters of an event session 306 that, when selected, results in an audio-video feed being provided within a respective placeholder 512. FIG. 6 illustrates an example dialogue box 602 that includes a text box for receiving such a hyperlink, as well as to submit a username and options to "join" for a participant's audio-video feed to be provided within a respective placeholder 512.

Figure 7A:
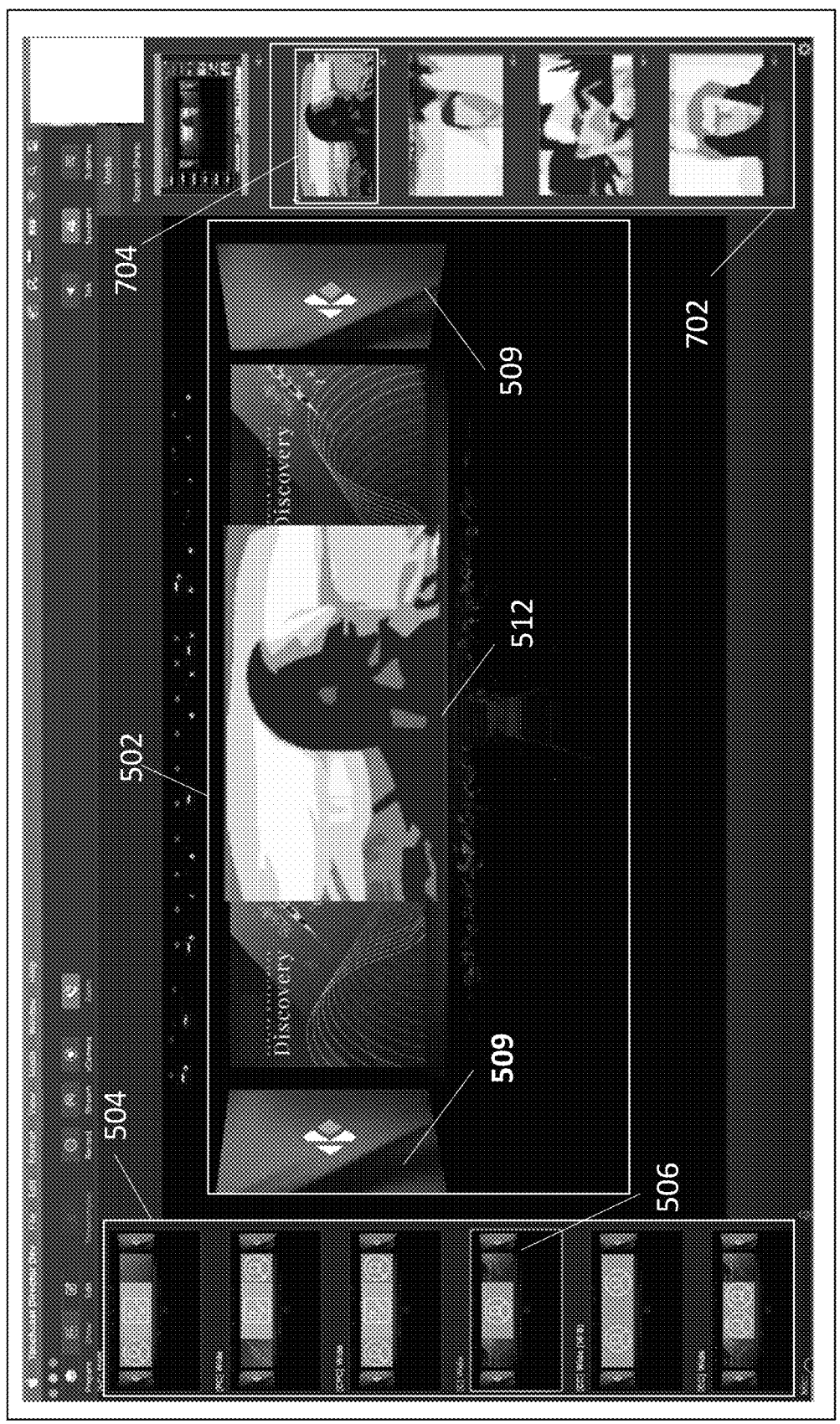
FIGS. 7A-7C illustrate example implementations of the present disclosure in which respective templates have been selected for inclusion of one or more audio-video feeds and placed in respective placeholder(s), in connection with an example implementation of the present disclosure.
Figure 7B:
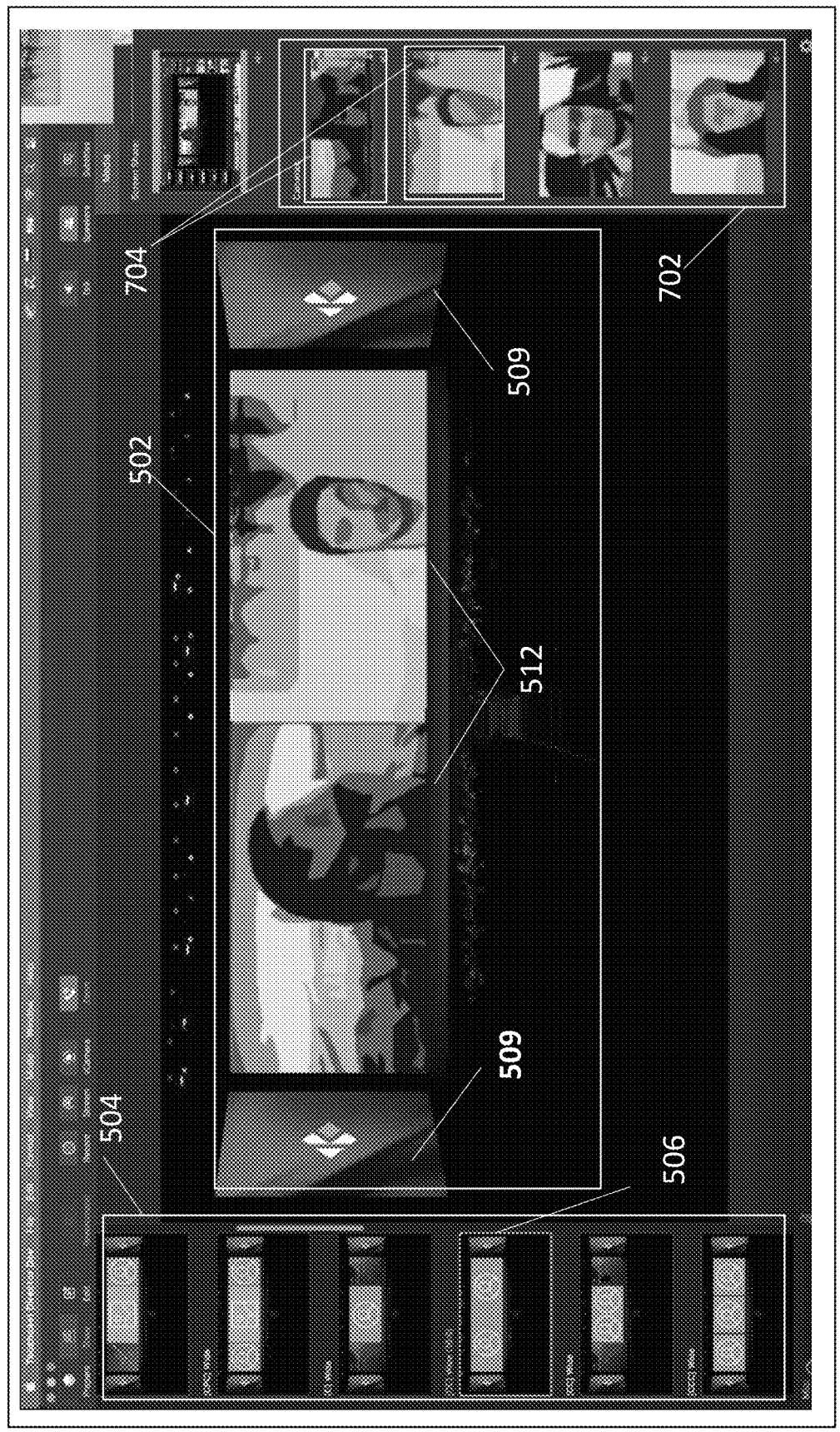
Figure 7C:
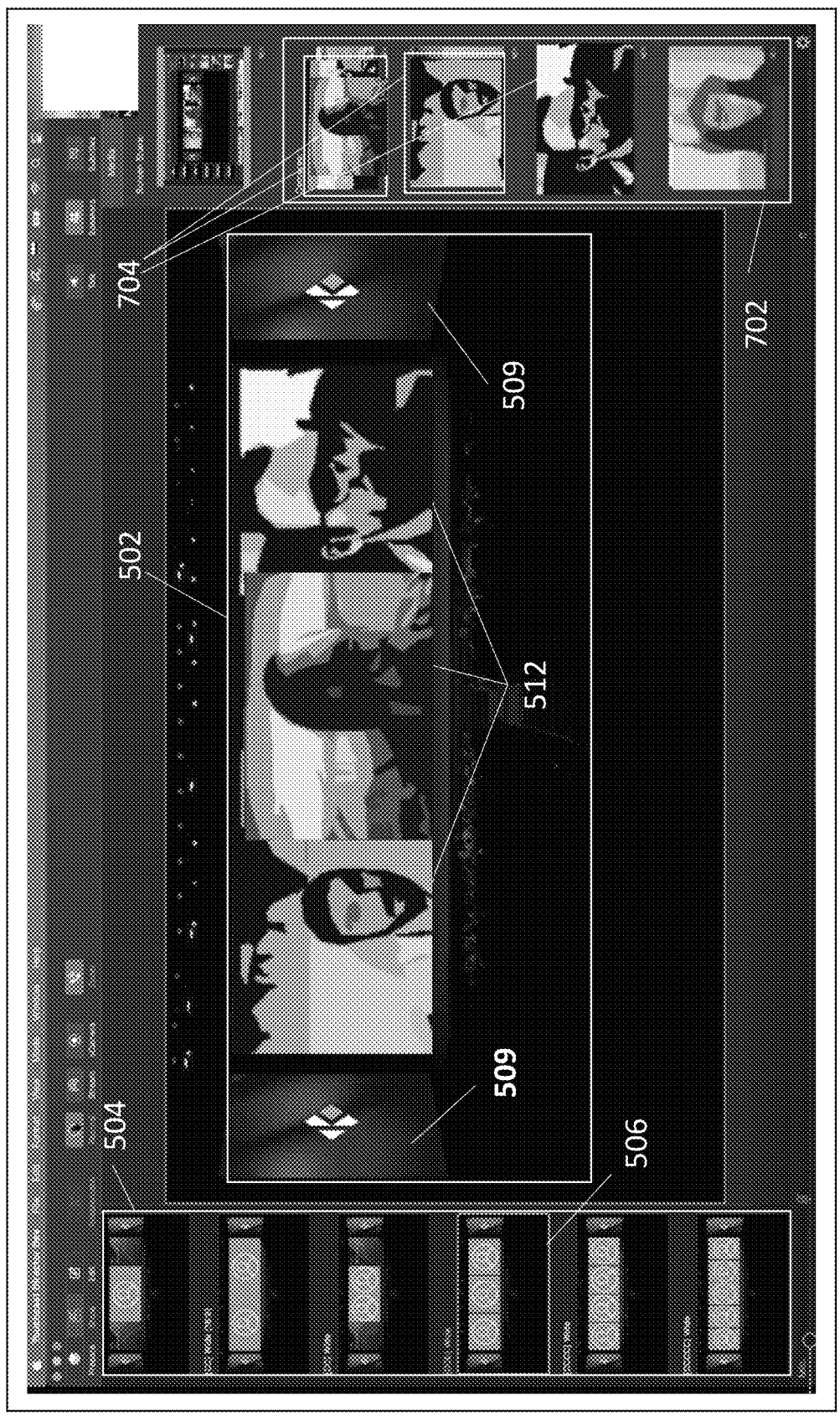

FIGS. 7A-7C illustrate example implementations of the present disclosure in which respective templates 506 have been selected for inclusion of one or more audio-video feeds and placed in respective placeholder(s) 512. For example, in FIG. 7A, a single audio-video feed 704 received from a participant's computing device within audio-video feed collection section 702 is provided in one placeholder 512 in accordance with the selected template 506. FIG. 7B illustrates an example implementation, in which two respective placeholders 512, in accordance with the selected template 506. FIG. 7C illustrates an example implementation in which audio-video feeds 704 received from three respective participants' computing devices are provided in three respective placeholders 512, in accordance with the selected template 506. Countless other selectable templates can be defined and provided in options section 504 to provide custom views and presentations of audio-video feed(s) and content (e.g., screen shares, image content, video content, multimedia content, textual content, or the like).

Figure 8:
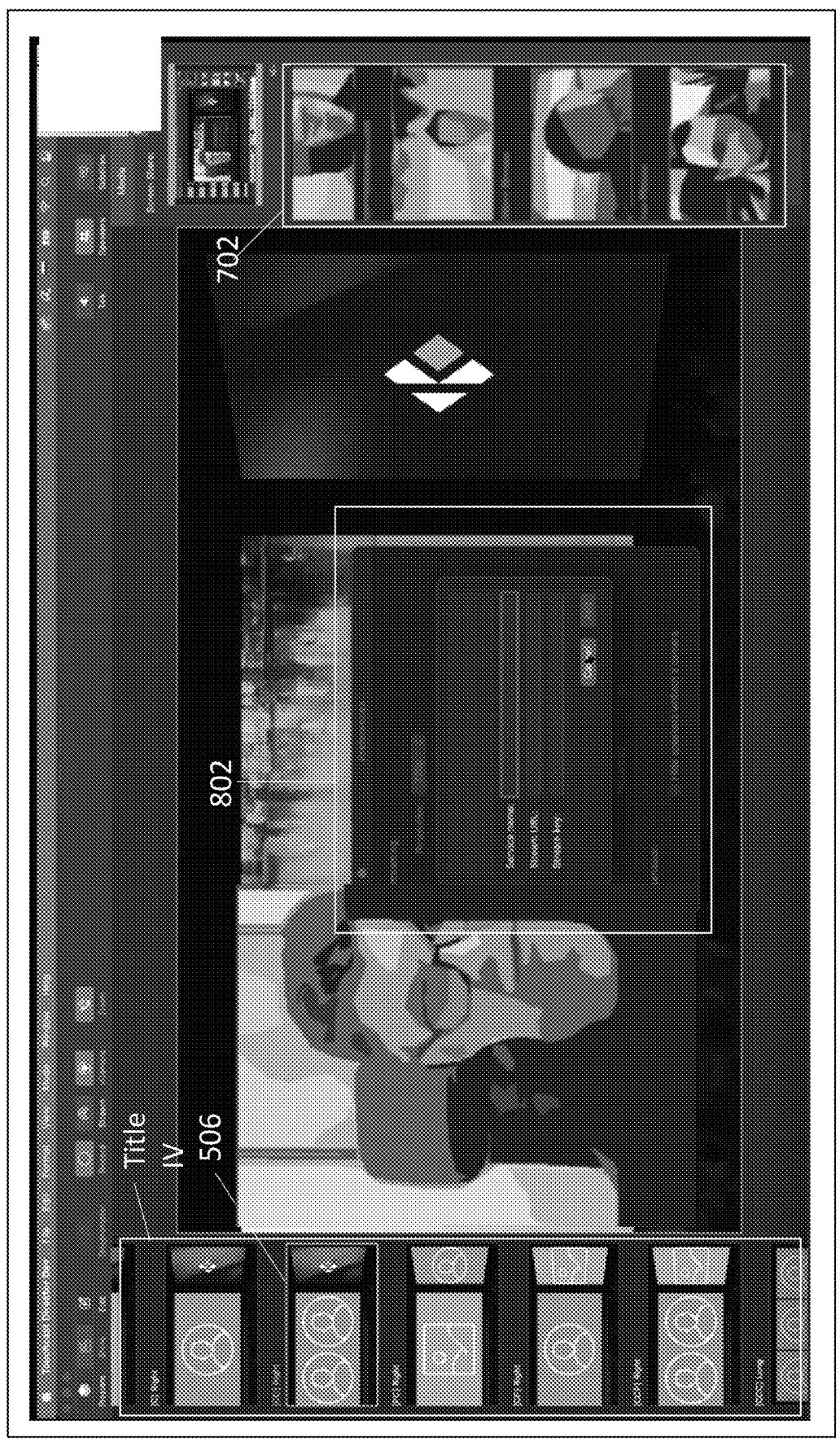
FIGS. 8 and 9 illustrate an example implementation of the present disclosure that includes dialog boxes for submitting preferences and parameters in connection with streaming services.
Figure 9:
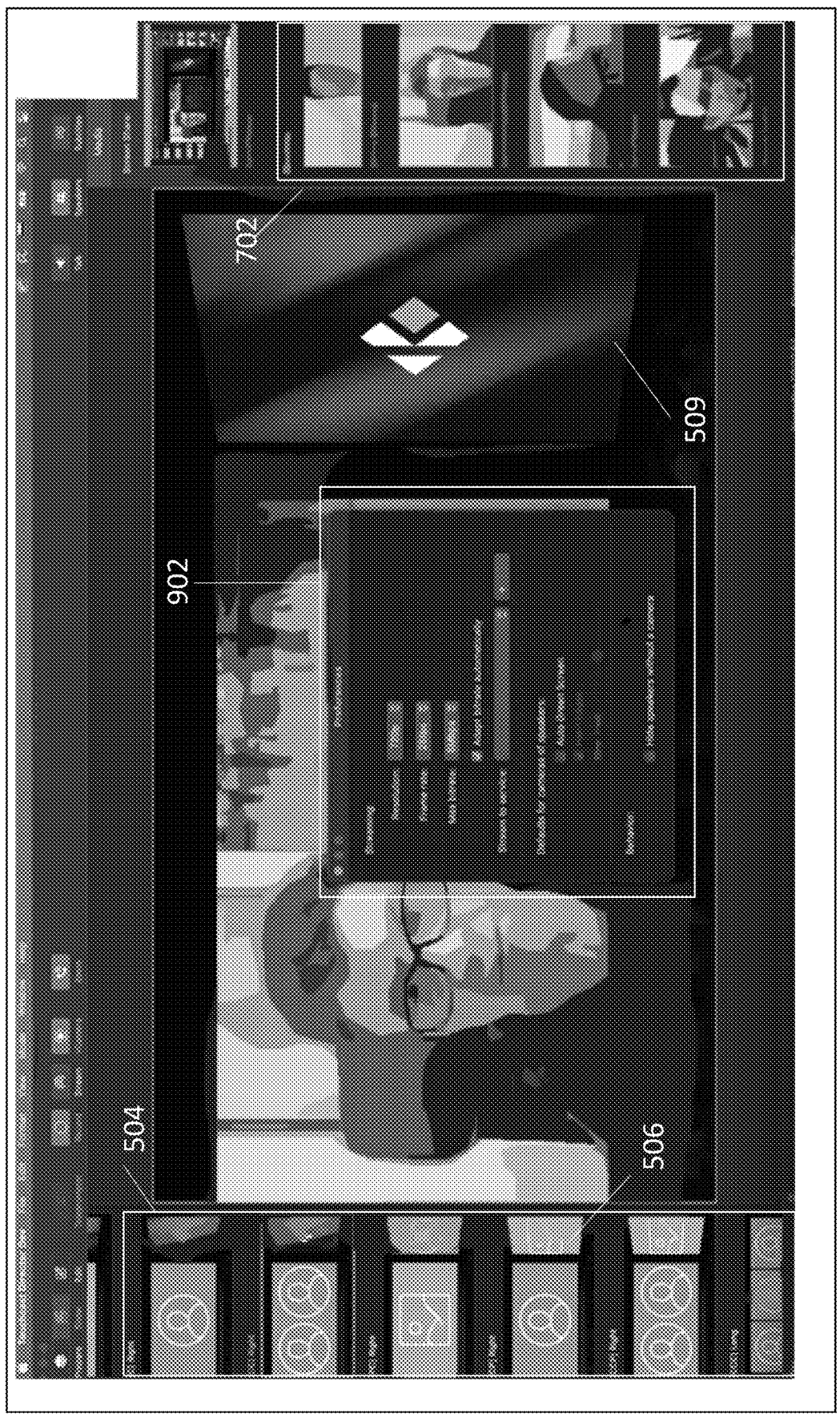

FIGS. 8 and 9 illustrate an example implementation of the present disclosure that in includes dialog boxes 802 and 902, respectively, for submitting preferences and parameters in connection with streaming services. For example, prompts are provided in for a user to submit a service name, a link to a stream ("URL"), and a stream key, for presenting live. In one or more implementations, a prompt is provided to guide the user to submit a service that supports real-time messaging protocol ("RTMP"), or one or more variations thereof (FIG. 8). In addition to providing a service name, link to a stream, and stream key, streaming preferences can further be provided as well as features associated with camera views and processing of video content. FIG. 9 includes a preferences dialog box 902 4 identifying resolution, frame rate and maximum bit rates for transmitted video content. Further, an option for adapting to bit rates automatically is providing, as well as an option for streaming to a respective service. Moreover, options are provided for camera defaults, such as automatic green screen functionality, hard edges and threshold values associated therewith. In addition, display options can be provided for various kinds of behavior, such as hiding speakers who are connected to a videoconference or other data-communication session without a camera.

Figure 10:
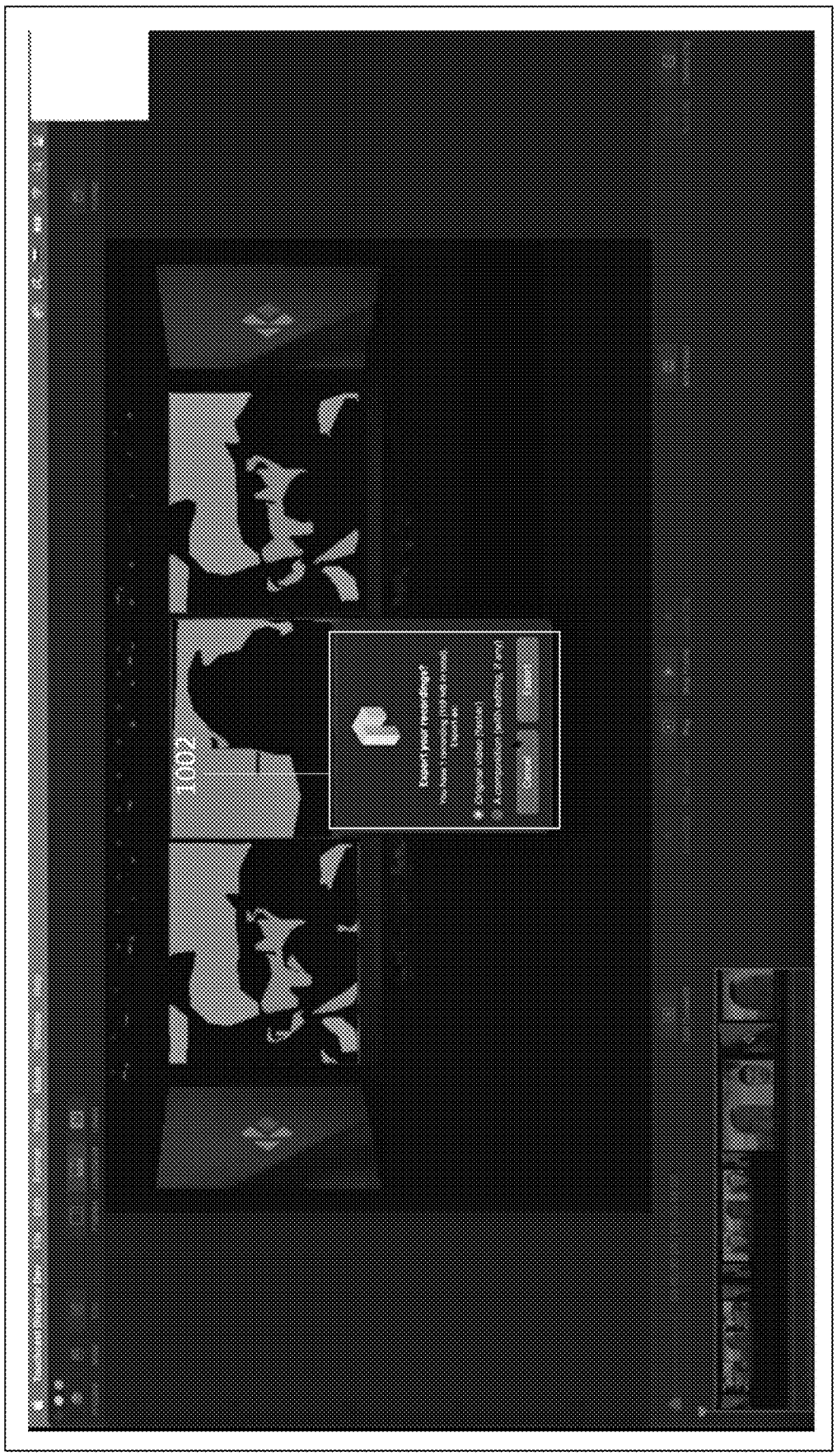
FIG. 10 illustrates an example display screen that includes a dialog box, which includes selectable options for exporting a recording, in connection with an example implementation of the present disclosure.

After a session 306 is complete, one or more options is available for saving, such as to data processing apparatus 102 or other device. FIG. 10 illustrates an example display screen that includes dialog box 1002, which includes selectable options for exporting a recording. For example, a recording can be exported in its original form or as a composition which can include additional editing. In one or more implementations, output from an event session 306 can be streamed, recorded or both streamed (e.g., via RTMP) and recorded (e.g., to an MP4 file). In one or more implementations, editing tools can be provided (e.g., for cropping, color correction, sound correction, or the like) and used alter audio-video content prior (or after), for example, being exported to an internet web site, saved to one or more databases, transmitted via e-mail or other suitable technique or protocol.

Thus, as shown and described herein, the present disclosure provides for systems and methods for directing scenes comprised of audio-video feeds received over one or more data-communication sessions (e.g., during a videoconference session). In accordance with the present disclosure, a "scene" refers, generally, to content that is displayed to devices during a data-communication session, such as a videoconference. For example, preview section 502 displays a scene that is provided to computing devices during a videoconference or other data-communication session. Respective streams can be positioned or placed in respective virtual screen displays to provide a photorealistic environment, such as an auditorium, for participants who attend remotely. In addition to displaying received audio-video feeds on virtual displays in virtual settings, such as in auditoriums shown in preview display section 502, the present disclosure includes software instructions that configure hardware, such as one or more processors comprised in data processing apparatus 102, user computing device 104, or other device to provide additional realism, including as shown and described herein.

The present disclosure provides improved realism as a function of improved background removal performed substantially in real time on audio-video content received by one or more computing devices via data-communication sessions. In addition to known chroma-based background removal techniques, the present disclosure includes instructions that are executed one or more computing devices to analyze image information and identifies elements in the frame to be removed. In one or more implementations, elements in a frame to be removed are identified by one or more processors using artificial intelligence that is based on machine learning. For example, one or more processors execute algorithms for machine learning using images in which a subject or subjects are identified. Once identified from existing images as a function of machine learning, and, thereafter, one or more algorithms can be executed by processor(s) to mask the background element(s) for removal out of an image frame. For example, subjects or aspects thereof can be automatically detected and a selection of the subject(s) can be made automatically based thereon. Thereafter, an inverse selection can be made, and the background can be selected and/or masked for removal out of an image frame. Alternatively, or in addition, one or more background elements can be identified and selected for removal.

In one or more implementations, machine learning algorithms can analyze an image after a user manually removes or identifies background element(s) to be removed from the frame. During machine learning, the processor(s) automatically remove or identify background element(s) to be removed and an analysis of the removed backgrounds from the respective images is made. Machine learning results in improved automatic selection, masking, and/or removal processes and future background removal occurs as a function of artificial intelligence. Following background removal, subjects can be isolated and respectively placed within a frame, which further contributes to improved realism.

Figure 11A:
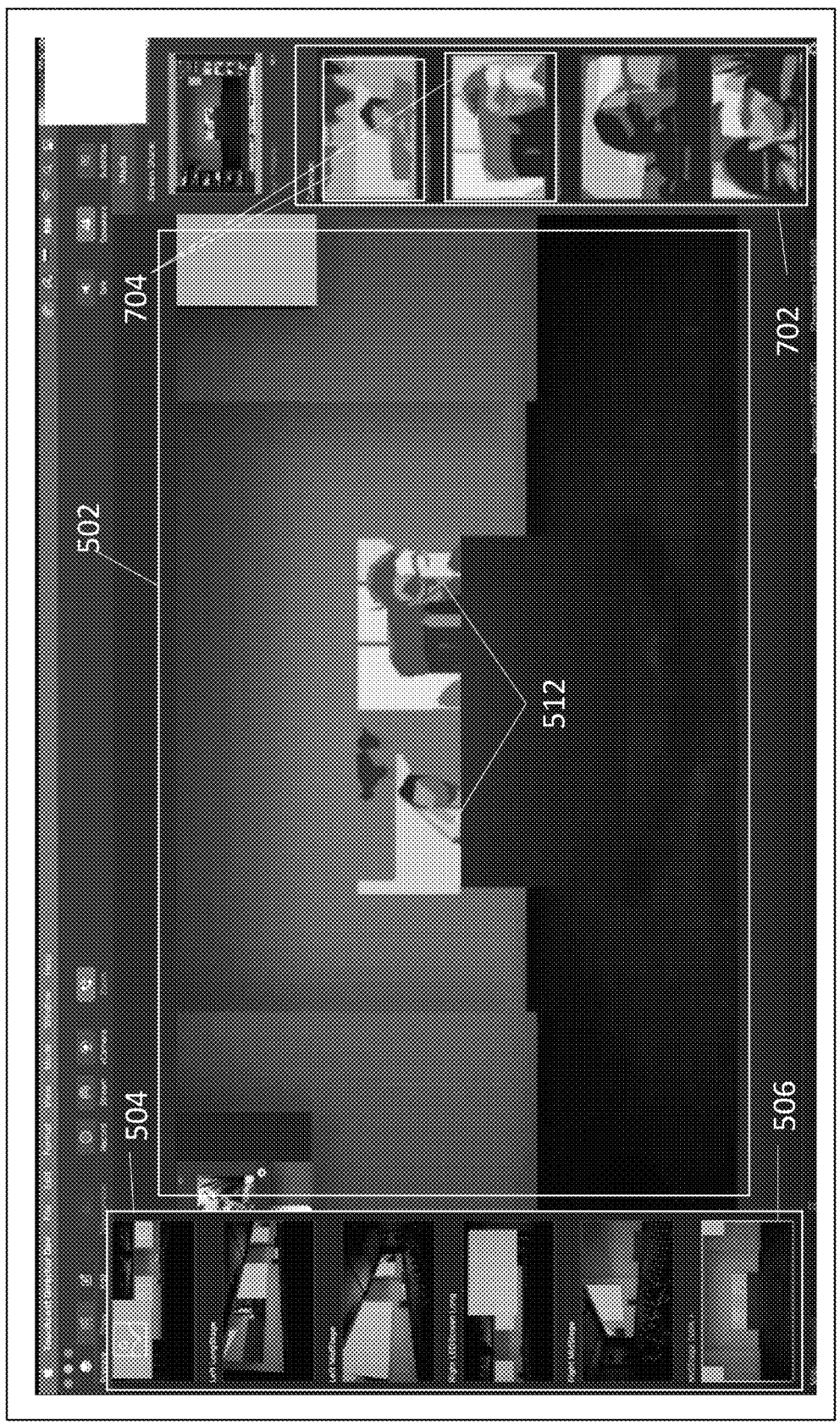
FIGS. 11A-11C illustrate example display screens showing an implementation of the present disclosure that demonstrates background removal and placement of subjects within a frame.
Figure 11B:
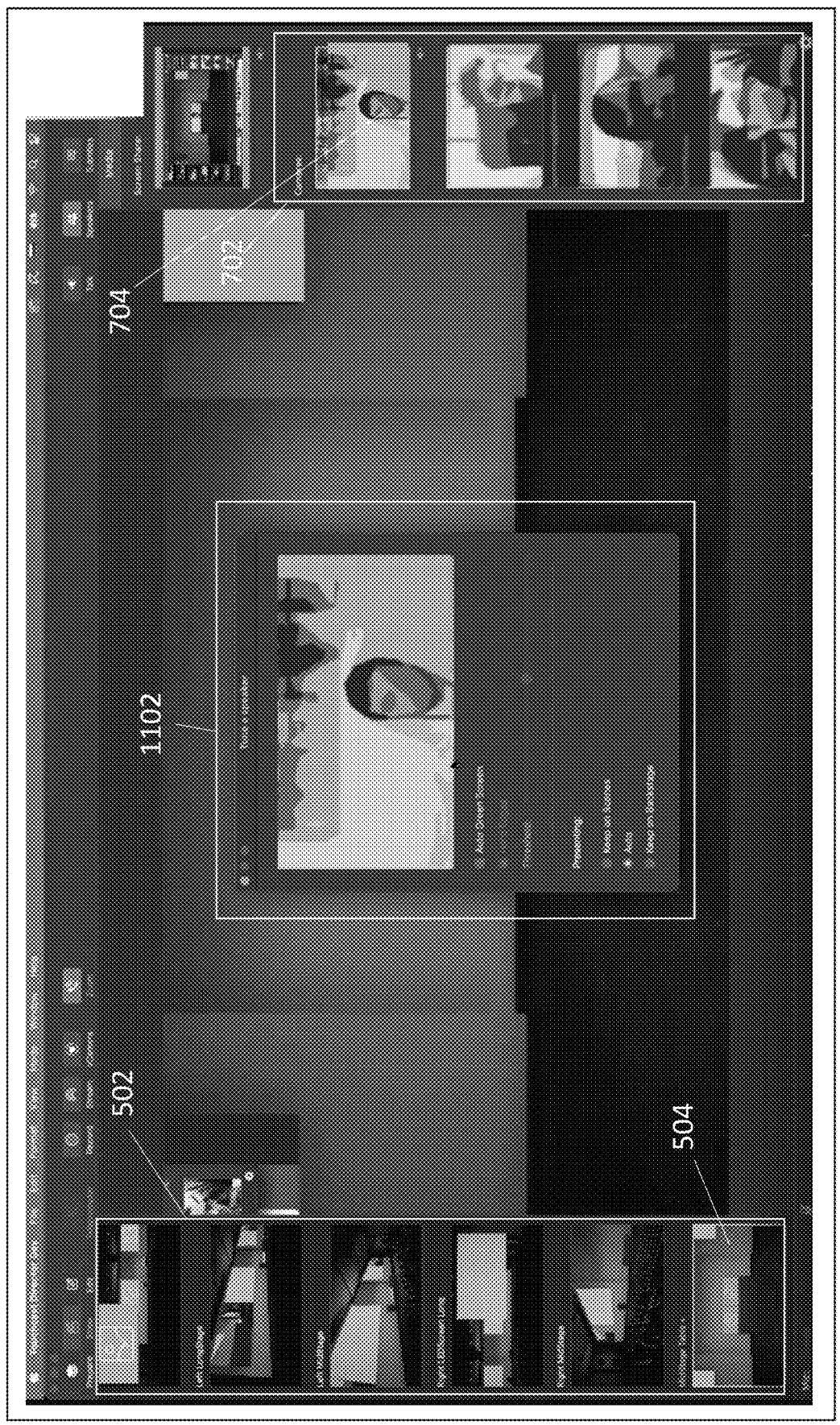
Figure 11C:
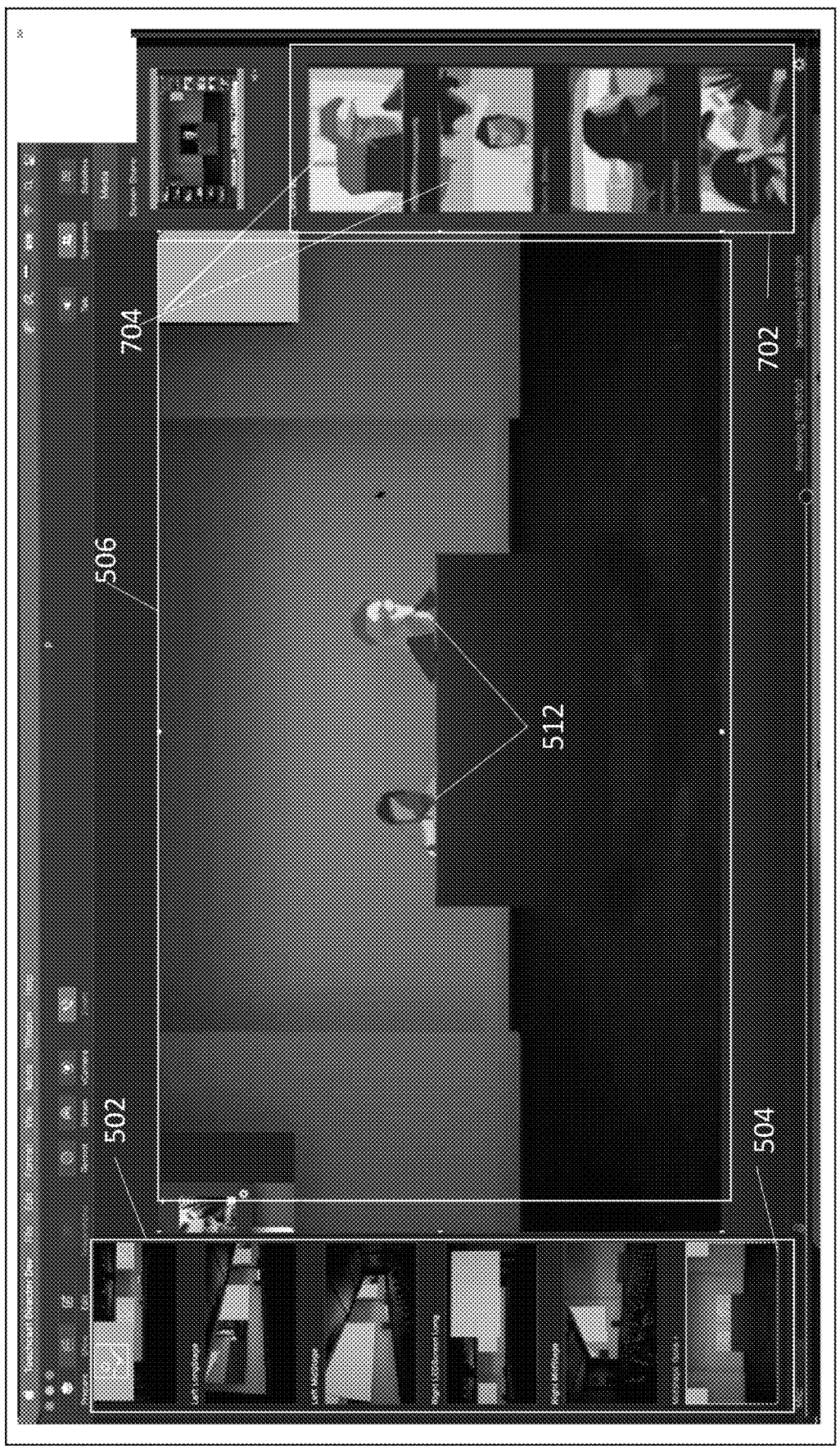

FIGS. 11A-11C illustrate example display screens showing an implementation of the present disclosure that demonstrates background removal and placement of subjects within a frame. In FIG. 11A, for example, two respective audio-video feeds 704 from audio-video feed collection section 702 are placed within two respective placeholders 512, in accordance with the selected template 506. FIG. 11B illustrates a dialog box 1102 that includes features for processing a respective audio-video feed, such as associated with background removal, formatting options (e.g., whether to automatic green screen functionality or provide hard edges and degrees of threshold therefor) and presenting options (e.g., whether to keep the subject on scenes, or keep on backstage), described herein.

FIG. 11C illustrates an example display screen in which background elements from two respective audio-video feeds 704 from audio-video feed collection section 702 have been removed and placed within two respective placeholders 512, in accordance with the selected template 506. The subjects are placed behind a virtual podium and appear on stage.

In one or more implementations of the present disclosure, a virtual and automatic form of direction is provided on a basis of machine learning, artificial intelligence, programming instructions, and other computing technology shown and described herein. For example, particular choices for presenting audio-video content, including content received over video-conference sessions from computing devices operated by respective participants, are made automatically for particular reasons, including as shown and described herein, to provide a cinematic and professional looking and sounding result. For example, decisions how a scene is presented, including who is to be featured, tracking moving subjects and presenting them in uniform or other particular ways, selecting which materials are to be featured, how subjects are isolated and presented (e.g., moved and positioned), specific image edits (e.g., lighting and color adjustments, sharpening, cropping, skew/perspective, or the like), specific audio adjustments (e.g., increasing/decreasing volume, filtering, adding or removing sound effects), and other direction decisions regarding the presentation of a scene can be made automatically by one or more processors. Such particular directing decisions go far beyond a static approach to presenting video feed that is received from a plurality of participants in a video-conferencing session.

In accordance with making a selection of one or more participants to feature in a respective scene, one or more processors executing instructions stored on processor readable media considers one or more variables and/or values associated therewith. For example, a determination can be made that one of a plurality of participants is speaking, moving about on-screen, sharing a screen display, or launching particular content on his or her computing device during a data-communication session. Upon a determination that one or more of these are occurring, a computing device, such as data processing apparatus 102, can select a respective audio-video feed 704 for further processing and/or inclusion in a respective placeholder 512. In the event of a determination that a plurality of such variables are occurring, particular actions can be taken based on the various conditions. For example, the order by which specific actions take place can have an impact on one or more decisions taken by one or more processors, including whether to include or remove particular audio-video content from a scene, ways by which image editing should occur, where to place audio-video content in a respective scene, or the like. For example, a participant who has been identified as an expert in a certain topic area has not spoken or otherwise contributed during an interactive data-communication session. Once that participant begins to speak, audio-video feed received from the computing device operated by the participant is provided in the scene. As the participant accesses a file or other content, such as by screen sharing on his or her computing device, a different respective template 506 is selected automatically for providing the shared content and the audio-video feed simultaneously. Thereafter, when another participant responds by speaking, yet another respective template 506 is selected automatically to accommodate providing the shared content, and the respective audio-video feeds from the 2 participants' computing devices.

It is recognized herein that live data-communication sessions, such as videoconferencing sessions, that include several or many participants' computing devices can be difficult to manage, such as when several participants attempt to contribute simultaneously. In one or more implementations, values (e.g., weights) can be defined in accordance with respective variables, such as in connection with certain participants, activity, or other variable. As participants contribute during a data-communication session, one or more computing processors, such as data processing apparatus 102, can perform operations to identify and even interpret such participation in order to include, edit, remove, or take other action on audio-video feeds. For example, voice recognition procedures can be taken substantially in real time to determine the relevance and/or significance of language being used by a particular participant during a data-communication session. Alternatively, or in addition, optical character recognition or other text recognition processes can occur substantially in real time to determine the relevance and/or significance of content a participant is attempting to share during a data-communication session. Depending upon the outcome of such determinations, for example, audio-video feeds can be included, edited, or removed from a scene.

In addition to including, excluding, or otherwise modifying aspects of the scene during an active data-communication session, other criteria can be used by one or more processors for performing operations in accordance with the present disclosure. For example, instructions can be executed by one or more processors to identify a frequency by which changes in a scene are made. In order to prevent unnecessary switching of changes within one scene or between several scenes, one or more processors may avoid taking action or wait a predefined amount of time, such as 30 seconds, before switching scenes, taking action that affects how appears. This can create a more fluid and realistic appearance for participants of a data-communication session, including by decreasing the number of discrete scenes or changes made within one scene that would otherwise occur.

Figure 12A:
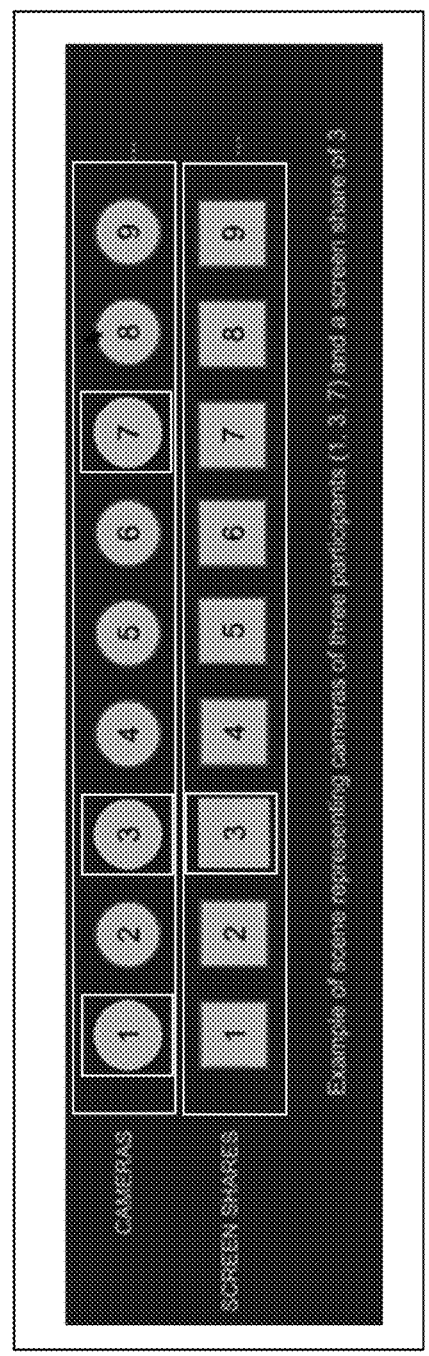
FIG. 12A is a simple block diagram illustrating cameras and respective screen sharing operations, in connection with an example implementation of the present disclosure.

FIG. 12A is a simple block diagram illustrating nine respective cameras (identified as circles numbered 1-9) and respective screen sharing operations (identified as squares, numbered 1-9) associated with respective computing devices operated by participants during a data-communication session. In the example shown in FIG. 12A, three respective cameras (numbers 1, 3, and 7) and one respective screen share (number 3) are identified for inclusion in a scene. Additional actions can be taken, such as to select a respective template 506 or perform background removal or other editing action).

In one or more implementations of the present disclosure, audio-video feeds are received from each of a plurality of computing devices during a data-communication session, such as from cameras 1-9. Some of the cameras, however, may provide content that is partially or even completely unable to capture content, such as due to the cameras' position or where a camera is pointing. In such cases, certain cameras of the total (e.g., 7 of the 9 cameras) may be deemed unusable for providing insufficient visibility. Similarly, certain participants using their computing devices to share screen displays may be deemed unusable for providing poor visibility of content the participant intends to share. In such cases, instructions can be executed by one or more processors to reduce the total number of available cameras and/or screen sharing operations for inclusion in a scene. Thus, in accordance with the present disclosure, intelligent decisions can be made as whether respective audio-video feed or other as well as particular editing operations are to take place.

Figure 12B:
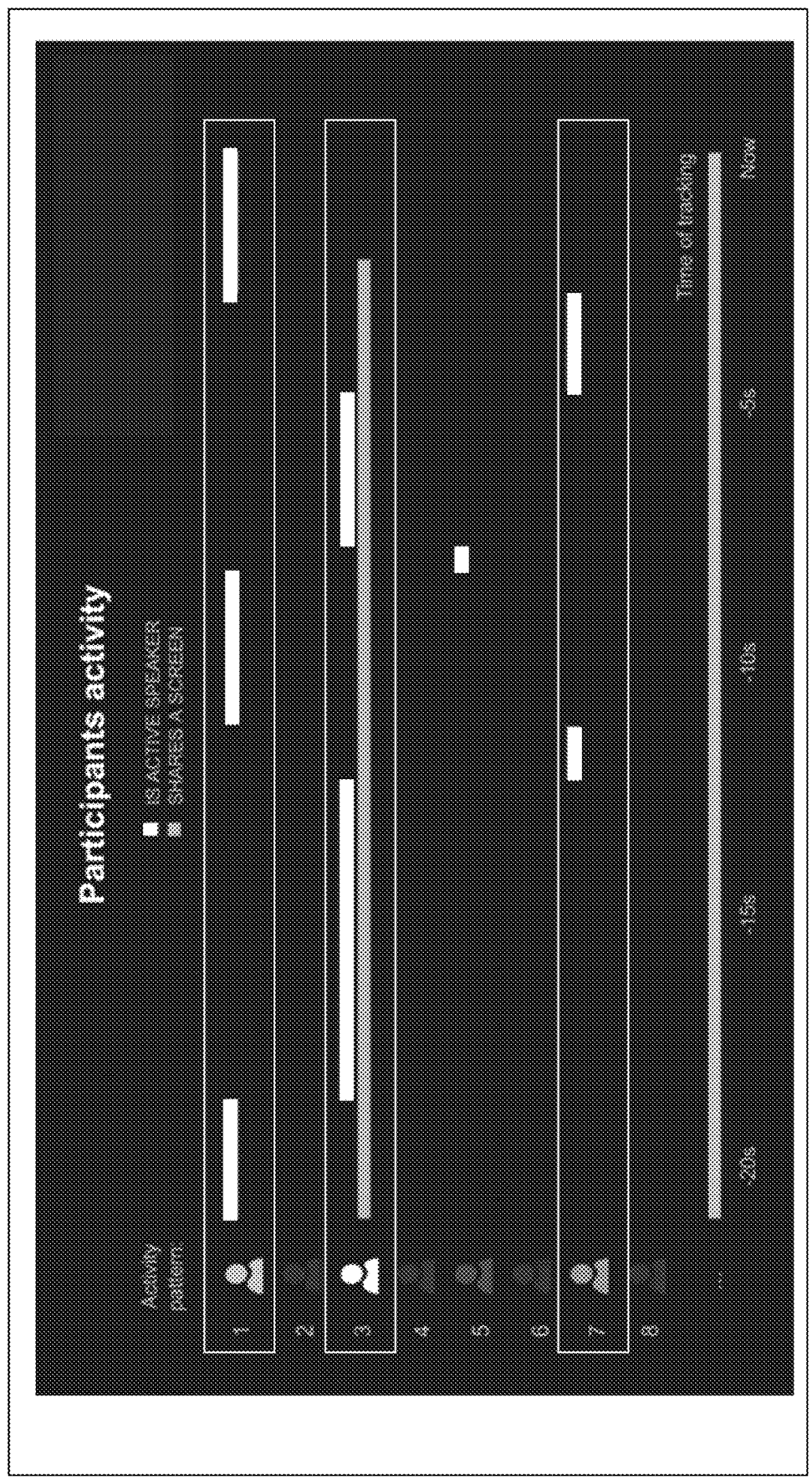
FIG. 12B illustrates activity patterns that occur over a period for the participants of respective cameras, in connection with an example implementation of the present disclosure.

Moreover, in one or more implementations, activity of respective participants is monitored and used to identify or otherwise determine a representative scene, including with regard to previously prepared scenes for providing during a respective session 306. FIG. 12B illustrates activity patterns that occur over a period for the participants of the respective cameras 1, 3, and 7 (FIG. 12A). For example, the first user (user 1) actively spoke three times over a 20 second period. The second user (user 3) spoke actively twice, for longer segments, over the same period. Further, the second user shared her screen for almost the entire 20 second period. The third user (user 7) actively spoke twice, albeit briefly, during the 20 second period. One user, user 5, also actively spoke at one point during the 20 second period, but was not featured during the scene. User 5 was excluded from being in the scene following, for example, a determination that the user's activity was incidental, not relevant, interruptive, or for other reasons made automatically as a function of artificial intelligence and machine learning, including as shown and described herein. By recognizing activity patterns illustrated in FIG. 12B that are consistent, for example, with previously prepared scenes, changes made to a scene, such as to add or remove users, change templates or other display features, can be avoided which results in a smoother, more realistic, and more pleasing appearance for participants.

More particularly, computing scene "actuality" in accordance with one or more implementations of the present disclosure can be based on variables and calculations. For example, determinations can be made based on: the time of tracking (e.g., "T" between 5 and 30 seconds); the time of being an active speaker during a past amount of time (e.g., "TAS" last 5 seconds); the time of sharing a screen during a past amount of time (e.g., "TSS" last 5 seconds); an importance value assigned for being an active speaker (e.g., "IAS" 1.0); an importance value assigned for sharing a screen (e.g., "ISS" 1.0); and a weight value assigned for a respective participant (e.g., "W" 1.0). Using these values, a value can be calculated for a camera of a respective participant (e.g., Camera value=W*ISS*TAS/T) and a value can be calculated for a screen share of a respective participant (Screen Share value=W*ISS*TSS/T). With regard to an actuality ("AS") of each prepared scene ("S"), scene, a value can be sum (C)+sum (S), which represents activities of participants during the most recent T seconds. Using the results of these calculations, for example, decisions can be made by one or more processors (e.g., configured with data processing apparatus 102) whether to add or remove respective audio-video feeds from a scene, as well as whether editing actions are to be taken, such as cropping, background removal processes, color revisions, skewing, perspective changes, or the like.

In one or more of the present disclosure, a three-dimensional ("3-D") graphics engine can be used to provide realism and photo-realistic appearances, for example, during events 306. 3-D graphics engines, such as used in gaming applications, can provide for sophisticated functionality, including to change camera angles, change points of view, and provide varying displays of objects and people. For example, 3-D model of an auditorium or other space can be dynamically represented, as camera views appear at varying heights, at different zoom lengths, different apertures, and as other cinematographic techniques are employed virtually. In one or more implementation, people can appear to be physically assembled in an auditorium or other space, and can be viewed from different angles as a virtual camera displays the scene from varying angles of view. In one or more implementations, audio-video feed from computing devices operated by respective participants can be received and edited so that the participants appear present in a setting. For example, a model of a human body can be shown sitting in an auditorium seat and appearing as one of the participants. For example, clothing can be approximated and/or included on for the model, and the head of the participant, as represented in audio-video feed, appears in place of the model's head. Physical characteristics of a participant, such as hair style, skin color and tones, or other physical aspects, can be analyzed and included in a virtual representation of the participant during an event 306. Moreover, other characteristics of a participant, such as mannerisms, gestures, body posture, or the like can be analyzed and included in a virtual representation of the participant during an event 306. For example, audio-video feed from a computing device operated by a participant of a virtual session 306 is received. The virtual session 306 appears to be taking place in an auditorium filled with other participants. As the user is watching and listening to the session 306, a virtual representation of the participant is generated and placed in the audience. As the participant is watching, the user leans back reclining in his chair. The audio-video feed received from the participant's computing device is analyzed and the virtual representation of the participant appears to lean back in his chair in the audience. When the participant shifts positions and leans forward, for example, the virtual representation can shift positions substantially simultaneously.

In one or more implementations of the present disclosure, audio-video feed received from participants can be edited automatically to promote uniformity in appearance. For example, variables can be defined for a preferred subject size, color and light balance, lens zoom length, or the like, and each audio-video feed received from respective devices can be edited to be at least within a range of tolerance of each (or at least some of) the defined variables. By editing the received audio-video feeds uniformly, individuals virtually placed in the same place or location are consistently sized, lit, colored, or the like, as they would be had they be physically present. As noted herein, the present disclosure can employ one or more 3-D models, including to provide virtual settings dynamically, such as from varying camera angles and focal lengths, and can support 360° viewing. As a camera pans around a virtual setting, a plurality of participants, for example, appearing to be sitting as an audience in front of a stage, are provided uniformly. This promotes photo-realism of implementations of the present disclosure, thereby improving participants' (and other individuals') experiences during virtual events.

Figure 12C:
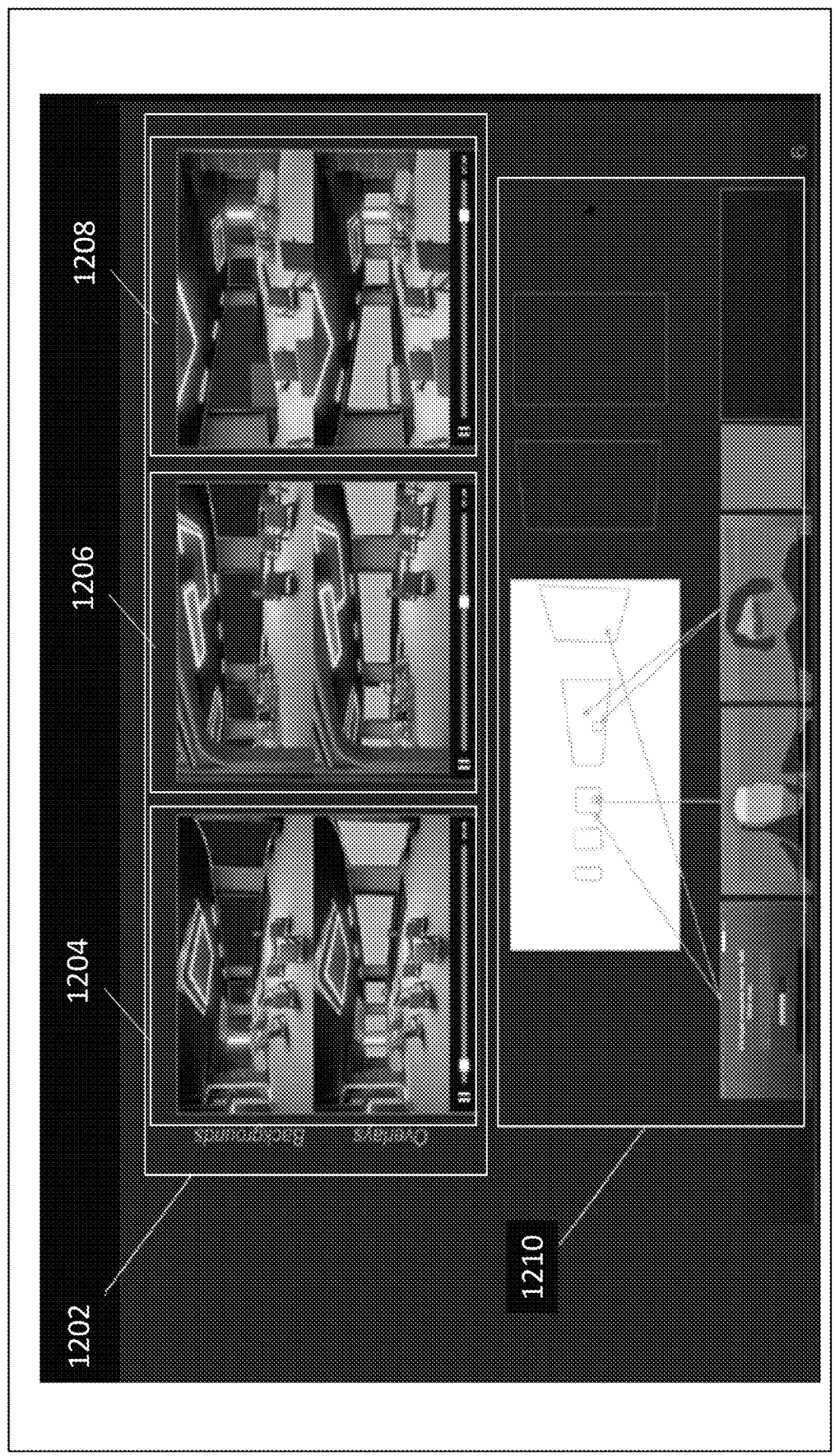
FIG. 12C illustrates an example display screen that is usable to preview and load respective backgrounds and overlays during an event session, in connection with an example implementation of the present disclosure.
Figure 13A:
FIG. 13A-13F illustrate an example implementation of the present disclosure in which a virtual musical event is provided for an audience in connection with an example implementation of the present disclosure.
Figure 13B:
Figure 13C:
Figure 13D:
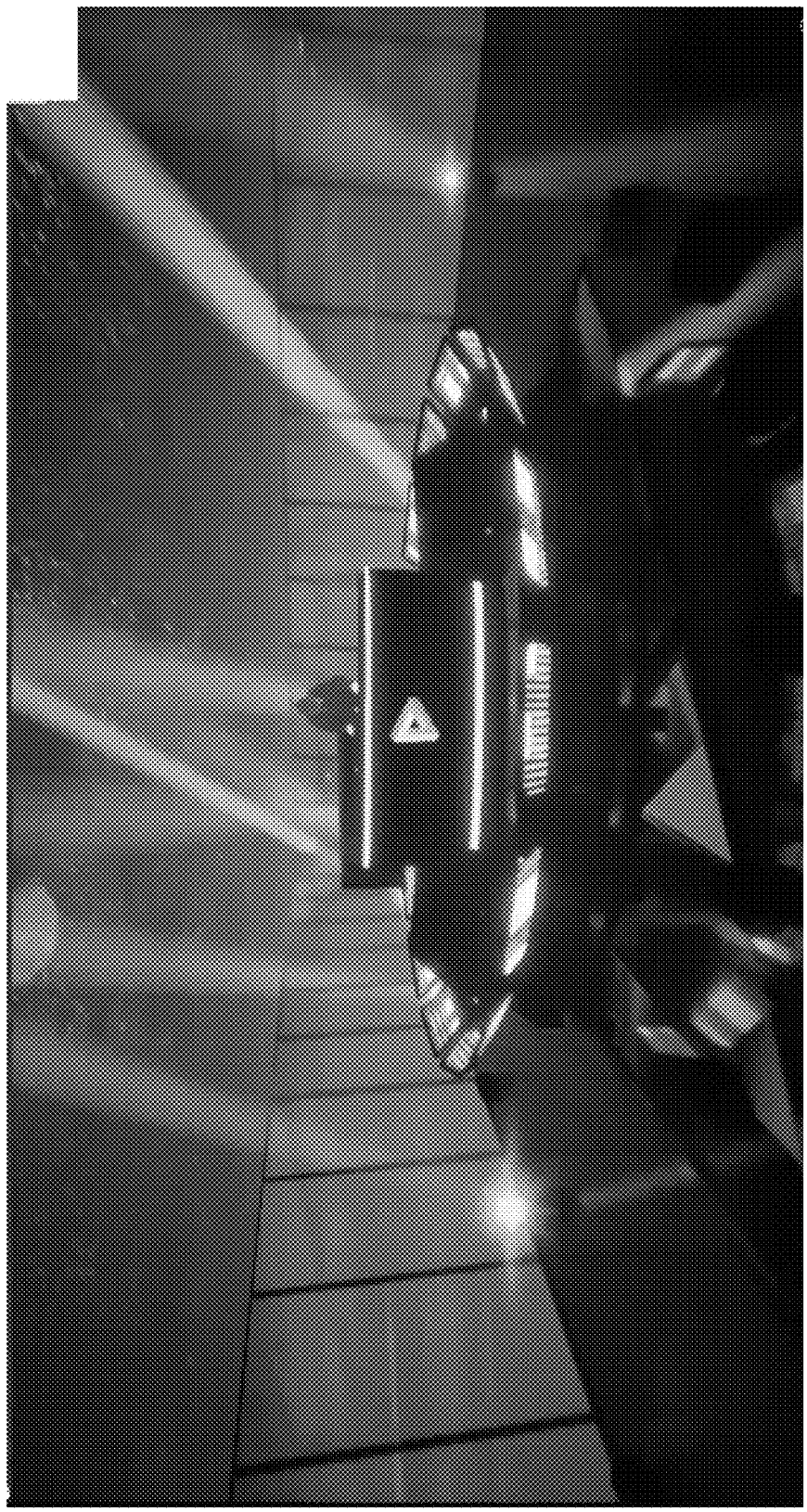
Figure 13E:
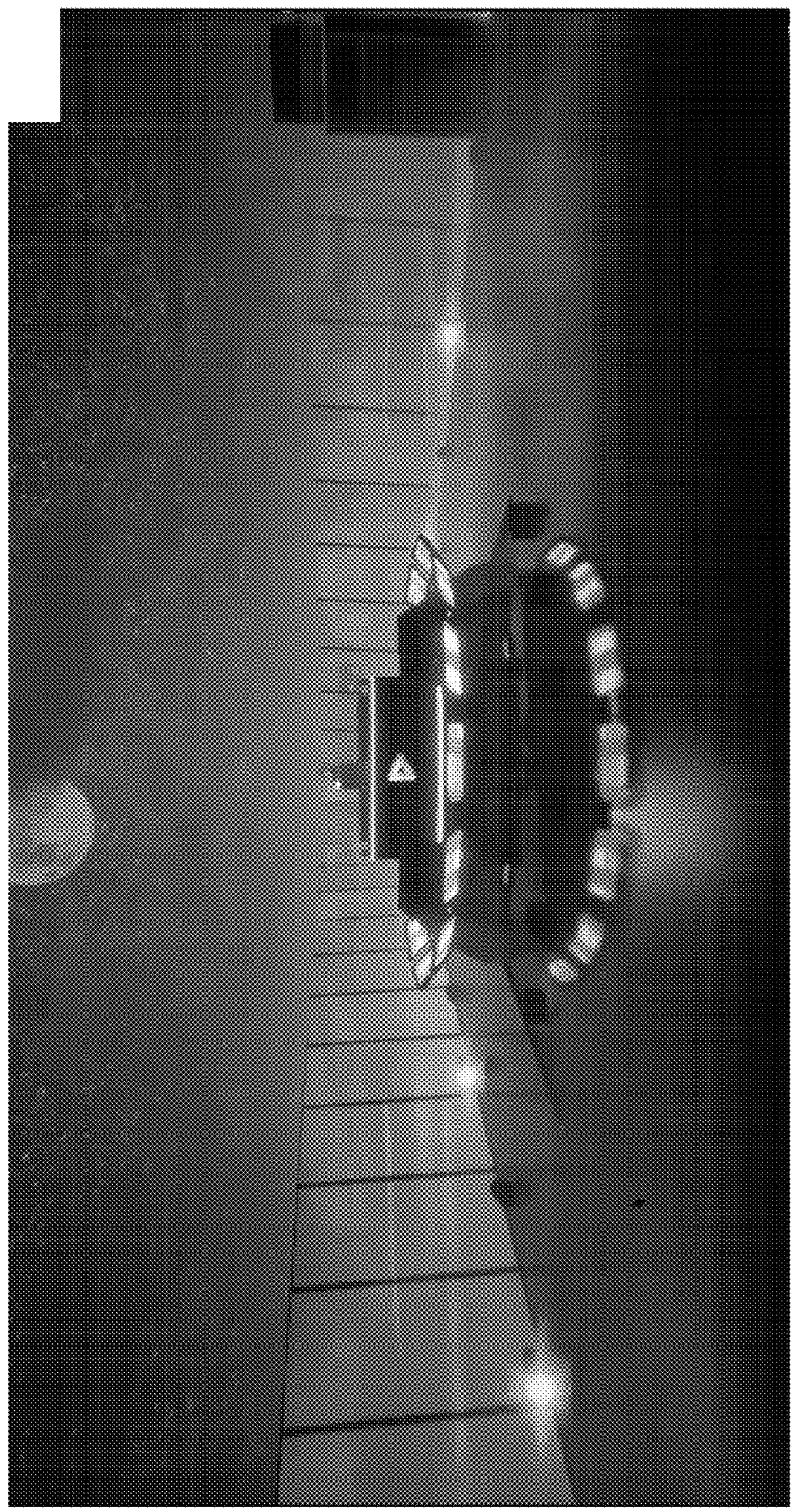
Figure 13F:
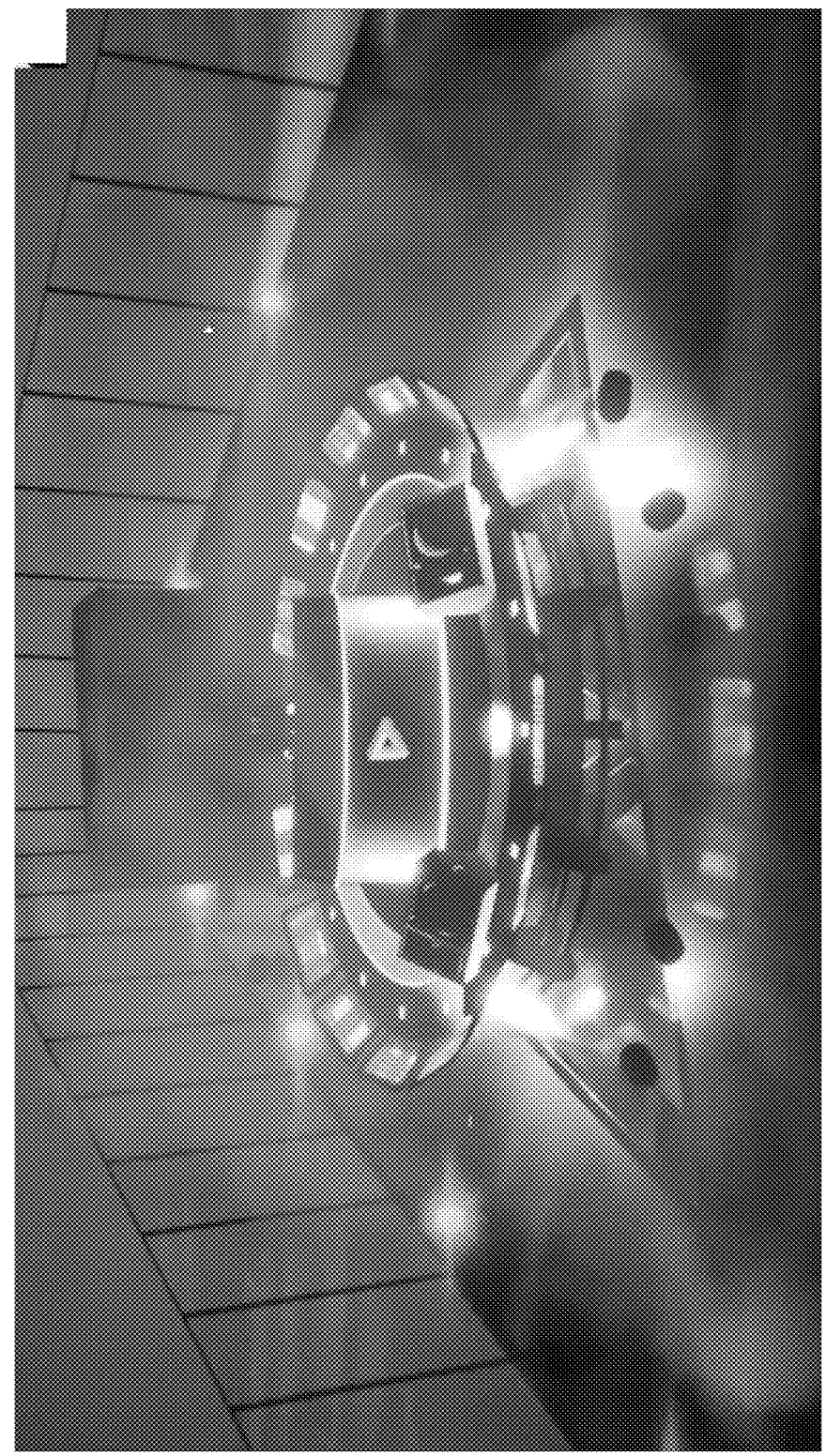

FIG. 12C illustrates an example display screen that is usable to preview and select respective backgrounds and overlays 1202, as well as to define for use during an event session 306, and to define respective angles of view for virtual camera work during the event 306. For example, preview section 1202 includes options for respective backgrounds and overlays, and for defining and/or reviewing camera movement and displays. For example, angles can be defined and previewed in displays 1204, 1206, and 1208, as a scene can be defined to appear from different angles and views. Presenter and content section 1210 includes options for defining a scene with respective presenters and content (e.g., screen shares) to be placed in respective virtual displays during a session 306.

In one or more implementations of the present disclosure, automatic direction via machine learning and/or artificial intelligence can assist or provide directing functionality. Use of such automatic direction can be useful during various conditions or contexts, such as when multiple events are provided simultaneously or burdensome context. Human operations can be assisted by artificial intelligence-based automatic direction or, when desired, replaced thereby for direction, such as shown and described herein. One or more controls can be provided in a graphical user interface for human operators to switch on and off automatic direction, to enable greater control for automatic processes to occur. In one or more implementations, automatic direction functionality can operate in an always-on context, until some human operator action occurs, such as selection of one or more controls that affect direction. After human operator activity occurs, which results in a cessation in artificial intelligence-based automatic directing, a period of time can be monitored, such as 5 seconds, after the human operator activity ends and in response automatic directing via artificial intelligence can resume.

One or more artificial intelligence-based directing functionality can occur via respective monitoring and processing of information associated with an event. For example, activity of participants (e.g., speaking or screen sharing) can be automatically monitored during an event and various directing can occur as a result. For example, a speaking participant can be featured, a shared screen can be displayed on one or more virtual large displays, or scene switching can occur automatically in response to various activity being detected or monitored. Individual participants can be assigned respective weights (e.g., by a human operator) that are used during automatic direction to feature participants more or less prominently than others. Artificial intelligence operations can also include computing a respective value representing an actual scene, and the most frequently speaking participants are featured on a scene. In this implementation, the number of scenes can decrease as the number of frequently speaking participants are featured.

Further, the present disclosure includes technology to improve the natural look of video direction that occurs as a function of artificial intelligence. Data can be analyzed that represent an active speaker and screen sharing among a group over a period of time and used to control direction. For example, a sample of the most recent 10 seconds can be interpreted as: a) a first participant shared a screen for 60% of a time period, while a second shared a screen for 20% of the time and a third for 10% of the time; or {3, 1, 2, 4} where there were 4 speakers over the last 10 seconds and only {3} shared a screen at that time. An example formula can include $C_i=W_i*IAS*delta_i=\{1$ when $P_i$ was an active speaker during last T seconds, 0 otherwise}. Alternatively, $S_i=W_i*ISS*delta_i=\{1$ when $P_i$ shared a screen during the last T seconds, 0 otherwise}. In one or more implementations, placeholders for cameras and shared screens can be used, and automated scene switching can occur when screen sharing starts or stops. Further, camera angles can be maintained (e.g., kept on) for presenting speakers, including to automatically portray speakers "backstage." Moreover, automatic locating of presenters and camera zooming can be provided to automatically single out presenters among multiple presenters. Further, sizes of speakers can be unified, such as by using face detection to crop camera angles and images. In one or more implementations, sizes of placeholders can be used as a parameter for automatically choosing one or more suitable scenes.

FIG. 13A-13F illustrate an example implementation of the present disclosure in which a musical event is provided for an audience. As can be seen in the example shown in FIGS. 13A-13F, a person is performing as a disc jockey during the event. Virtual display screens appear (FIG. 13A) and disappear (FIG. 13B), and colorful backgrounds of space appear projected behind the performer. Virtual translucent panels, such as appearing as glass, acrylic, or other material, appear around the stage and reflect light, display images, or otherwise add drama and realism to the virtual setting. Further, virtual moving spotlights are positioned at various locations around the stage and appear to shine moving colored beams of lights on and around the stage during the performance. Camera angles can pan and zoom, including to show virtual representations of audience members (FIG. 13C) being present and reacting to the performance. As noted herein, representations of the audience members and the performer can be generated using received audio-video feeds during a data-communication session from computing devices operated by the audience members and performer. Using one or more virtual 3-D graphics engines, camera(s) can appear to pan, zoom, fall, and rise during the performance, which contributes to photo-realism and the participants' experience.

Thus, as shown and described herein, the present disclosure provides a myriad of options for management, presentation, and access control to interactive online events and materials associated there with. The present disclosure provides an end-to-end solution for providing interactive virtual meeting events, and participants can attend and communicate together via controlled virtual environments, and can share information and materials via the systems and methods provided herein.

While operations shown and described herein may be in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this disclosure, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed:

1. A computer-implemented method for providing an interactive virtual event session for respective pluralities of devices substantially in real-time, the method comprising:
   providing, by at least one computing device configured by executing instructions stored on non-transitory processor readable media, a data communication session to which a plurality of computing devices operated by participants of an event session connect;
   receiving, by the at least one computing device from the plurality of computing devices via the data communication session, respective audio-video feeds including content captured by respective cameras and microphones configured with the plurality of computing devices;
   adjusting, by the at least one computing device, at least some of the content in at least two of the respective audio-video feeds, including by executing editing processes;
   providing, by the at least one computing device to each of the plurality of computing devices, a virtual setting for the event session;
   modifying, by the at least one computing device, the setting to include at least the adjusted content; and
   providing, by the at least one computing device to each of the plurality of computing devices using artificial intelligence, changing views of the virtual setting and the adjusted content.

2. The method of claim 1, further comprising:
   providing, by the at least one computing device, at least one virtual display screen in the virtual setting, and
   including at least some of the adjusted content in the at least one virtual display screen.

3. The method of claim 1, wherein adjusting at least some of the content comprises:
   using artificial intelligence, by the at least one computing device, to identify background elements; and
   using artificial intelligence, by the at least one computing device, to remove the identified background elements and to isolate at least one subject.

4. The method of claim 3, further comprising positioning, by the at least one computing device, the isolated at least one subject in the virtual setting.

5. The method of claim 1, wherein adjusting at least some of the content comprises:
   using artificial intelligence, by the at least one computing device, to identify background elements; and
   using artificial intelligence, by the at least one computing device, to remove the identified background elements and to isolate at least one subject; and, further comprising:
   positioning, by the at least one computing device, the isolated at least one subject in the virtual setting;
   providing, by the at least one computing device, at least one virtual display screen in the virtual setting, and
   displaying the isolated at least one subject in the at least one virtual display screen.

6. The method of claim 1, further comprising:
   providing, by the at least one computing device, the respective audio-video feeds to a 3-D graphics engine.

7. A computer-implemented system for providing an interactive virtual event session for respective pluralities of devices substantially in real-time, the system comprising:
   non-transitory processor readable media;
   at least one computing device comprising at least one processor that is operatively coupled to the non-transitory processor readable media, wherein the non-transitory processor readable media have instructions that, when executed by the at least one processor, cause the at least one processor to perform the following steps:
   provide a data communication session to which a plurality of computing devices operated by participants of an event session connect;
   receive, from the plurality of computing devices via the data communication session, respective audio-video feeds including content captured by respective cameras and microphones configured with the plurality of computing devices;
   adjust at least some of the content in at least two of the respective audio-video feeds, including by executing editing processes;
   provide, to each of the plurality of computing devices, a virtual setting for the event session;
   modify the setting to include at least the adjusted content; and
   provide, to each of the plurality of computing devices using artificial intelligence, changing views of the virtual setting and the adjusted content.

8. The system of claim 7, wherein the non-transitory processor readable media further have instructions that, when executed by the at least one processor, cause the at least one processor to:
   provide, by the at least one computing device, at least one virtual display screen in the virtual setting, and
   include at least some of the adjusted content in the at least one virtual display screen.

9. The system of claim 7, wherein adjusting at least some of the content comprises:
   using artificial intelligence, by the at least one computing device, to identify background elements; and
   using artificial intelligence, by the at least one computing device, to remove the identified background elements and to isolate at least one subject.

10. The system of claim 9, wherein the non-transitory processor readable media further have instructions that, when executed by the at least one processor, cause the at least one processor to:
    position, by the at least one computing device, the isolated at least one subject in the virtual setting.

11. The system of claim 7, wherein adjusting at least some of the content comprises:
    using artificial intelligence, by the at least one computing device, to identify background elements; and
    using artificial intelligence, by the at least one computing device, to remove the identified background elements and to isolate at least one subject; and
    further wherein the non-transitory processor readable media further have instructions that, when executed by the at least one processor, cause the at least one processor to:
    position the isolated at least one subject in the virtual setting;
    provide at least one virtual display screen in the virtual setting, and
    display the isolated at least one subject in the at least one virtual display screen.

12. The system of claim 7, wherein the non-transitory processor readable media further have instructions that, when executed by the at least one processor, cause the at least one processor to:
    provide the respective audio-video feeds to a 3-D graphics engine.

13. A non-transitory computer storage medium encoded with a computer program, the program comprising instructions that when executed by at least one computing device cause the at least one computing device to perform operations for providing an interactive virtual event session for respective pluralities of devices substantially in real-time, the operations comprising:
- providing, by at least one computing device, a data communication session to which a plurality of computing devices operated by participants of an event session connect;
- receiving, by the at least one computing device from the plurality of computing devices via the data communication session, respective audio-video feeds including content captured by respective cameras and microphones configured with the plurality of computing devices;
- adjusting, by the at least one computing device, at least some of the content in at least two of the respective audio-video feeds, including by executing editing processes;
- providing, by the at least one computing device to each of the plurality of computing devices, a virtual setting for the event session;
- modifying, by the at least one computing device, the setting to include at least the adjusted content; and
- providing, by the at least one computing device to each of the plurality of computing devices using artificial intelligence, changing views of the virtual setting and the adjusted content.

14. The computer storage medium of claim 13, the operations further comprising:
- providing, by the at least one computing device, at least one virtual display screen in the virtual setting, and including at least some of the adjusted content in the at least one virtual display screen.

15. The computer storage medium of claim 13, wherein adjusting at least some of the content comprises:
- using artificial intelligence, by the at least one computing device, to identify background elements; and
- using artificial intelligence, by the at least one computing device, to remove the identified background elements and to isolate at least one subject.

16. The computer storage medium of claim 15, the operations further comprising:
- positioning, by the at least one computing device, the isolated at least one subject in the virtual setting.

17. The computer storage medium of claim 13, wherein adjusting at least some of the content comprises:
- using artificial intelligence, by the at least one computing device, to identify background elements; and
- using artificial intelligence, by the at least one computing device, to remove the identified background elements and to isolate at least one subject;
- and wherein the operations further comprise:
- positioning, by the at least one computing device, the isolated at least one subject in the virtual setting;
- providing, by the at least one computing device, at least one virtual display screen in the virtual setting, and
- displaying the isolated at least one subject in the at least one virtual display screen.

18. The computer storage medium of claim 13, the operations further comprising:
- providing, by the at least one computing device, the respective audio-video feeds to a 3-D graphics engine.

\* \* \* \* \*